US012761660B1

(12) United States Patent
Clark et al.

(10) Patent No.: US 12,761,660 B1
(45) Date of Patent: Oct. 13, 2026

(54) SYSTEM AND METHOD FOR POSITIONING ONE OR MORE UNMANNED AERIAL VEHICLES IN A FEATURELESS ENVIRONMENT

(71) Applicant: BlueHalo, LLC, Huntsville, AL (US)

(72) Inventors: Alexis Henry Clark, Owens Crossroads, AL (US); Levi Judah Smolin, Brownsboro, AL (US)

(73) Assignee: BlueHalo, LLC, Huntsville, AL (US)

( * ) Notice: Subject to any disclaimer, the term of this patent is extended or adjusted under 35 U.S.C. 154(b) by 333 days.

(21) Appl. No.: 18/593,577

(22) Filed: Mar. 1, 2024

Related U.S. Application Data

(60) Provisional application No. 63/449,090, filed on Mar. 1, 2023.

(51) Int. Cl.
*G05D 1/48* (2024.01)
*G05D 1/248* (2024.01)
(Continued)

(52) U.S. Cl.
CPC ............... *G05D 1/48* (2024.01); *G05D 1/248* (2024.01); *G05D 1/606* (2024.01); *G05D 1/69* (2024.01); *G06V 10/751* (2022.01); *G06V 20/17* (2022.01); *G05D 2109/20* (2024.01); *G05D 2111/10* (2024.01)

(58) Field of Classification Search
CPC .......... G05D 1/48; G05D 1/248; G05D 1/606; G05D 1/69; G05D 2109/20; G05D 2111/10; G06V 10/751; G06V 20/17
USPC ... 701/28, 25, 1, 120, 26, 14, 117, 408, 469, 701/468, 10, 93, 450, 412, 410, 4, 116, 701/411, 7
See application file for complete search history.

(56) References Cited

U.S. PATENT DOCUMENTS 3,465,339 A 9/1969 Marner
3,665,467 A 5/1972 Haroules et al.
(Continued)

FOREIGN PATENT DOCUMENTS

CN 108693377 A 10/2018
CN 115686105 A 2/2023
(Continued)

OTHER PUBLICATIONS

U.S. Appl. No. 17/951,386, filed Sep. 14, 2023_CN_115686105_A_H .pdf,Feb. 20, 2023.

*Primary Examiner* — Anne Marie Antonucci
*Assistant Examiner* — Jodi Jones
(74) *Attorney, Agent, or Firm* — Amster, Rothstein & Ebenstein LLP

(57) ABSTRACT

An unmanned aerial vehicle comprising a first optical camera mounted on the first unmanned aerial vehicle with a first field of view, a first flight controller, a processor operably connected to the first optical camera and the first flight controller, and non-transitory computer readable memory operably connected to the processor and including processor executable code that when executed by the processor performs the steps of obtains a plurality of images, determines based on sets of pixel coordinates in the first and second plurality of images, a distance travelled by a second unmanned aerial vehicle, generates flight instructions, and updates a target position in the non-transitory computer readable memory.

37 Claims, 14 Drawing Sheets

(51) Int. Cl.

| | |
|---|---|
| ***G05D 1/606*** | (2024.01) |
| ***G05D 1/69*** | (2024.01) |
| ***G05D 109/20*** | (2024.01) |
| ***G05D 111/10*** | (2024.01) |
| ***G06V 10/75*** | (2022.01) |
| ***G06V 20/17*** | (2022.01) |

(56) References Cited

U.S. PATENT DOCUMENTS

| | | | | |
|---|---|---|---|---|
| 5,349,294 | A | 9/1994 | Kasuboski | |
| 5,639,954 | A | 6/1997 | Crothers et al. | |
| 5,639,964 | A | 6/1997 | Djorup | |
| 6,012,675 | A | 1/2000 | Cocatre-Zilgien | |
| 7,644,016 | B2 | 1/2010 | Nycz et al. | |
| 7,750,841 | B2 | 7/2010 | Oswald et al. | |
| 9,413,418 | B2 | 8/2016 | Bottazzi et al. | |
| 9,485,037 | B1 | 11/2016 | Weller et al. | |
| 9,489,813 | B1 | 11/2016 | Beigel | |
| 9,797,988 | B2 | 10/2017 | Charvat et al. | |
| 9,915,725 | B1 | 3/2018 | Charvat et al. | |
| 10,009,901 | B2 | 6/2018 | Gerszberg | |
| 10,073,162 | B2 | 9/2018 | Charvat et al. | |
| 10,074,889 | B2 | 9/2018 | Charvat et al. | |
| 10,094,909 | B2 | 10/2018 | Charvat et al. | |
| 10,097,241 | B1 | 10/2018 | Bogdan et al. | |
| 10,139,484 | B2 | 11/2018 | Yoon et al. | |
| 10,205,218 | B2 | 2/2019 | Charvat et al. | |
| 10,242,273 | B1 | 3/2019 | Eckman | |
| 10,386,456 | B1 | 8/2019 | Zai et al. | |
| 10,403,161 | B1 | 9/2019 | Bry et al. | |
| 10,422,870 | B2 | 9/2019 | Mindell et al. | |
| 10,495,421 | B2 | 12/2019 | Abramov et al. | |
| 10,505,256 | B2 | 12/2019 | Charvat et al. | |
| 10,571,561 | B2 | 2/2020 | Zorea et al. | |
| 10,591,592 | B2 | 3/2020 | Mindell et al. | |
| 10,600,295 | B2 | 3/2020 | Kempel et al. | |
| 10,665,923 | B2 | 5/2020 | Charvat et al. | |
| 10,712,738 | B2 | 7/2020 | Cella et al. | |
| 10,732,621 | B2 | 8/2020 | Cella et al. | |
| 10,757,549 | B2 | 8/2020 | Ganz et al. | |
| 10,992,024 | B2 | 4/2021 | Charvat et al. | |
| 11,050,133 | B2 | 6/2021 | Charvat et al. | |
| 11,050,134 | B2 | 6/2021 | Charvat et al. | |
| 11,064,184 | B2 | 7/2021 | Choi et al. | |
| 11,074,827 | B2 | 7/2021 | Choi et al. | |
| 11,126,204 | B2 | 9/2021 | Abramov et al. | |
| 11,177,554 | B2 | 11/2021 | Charvat et al. | |
| 11,295,458 | B2 * | 4/2022 | Dasgupta | G06V 20/13 |
| 11,323,624 | B2 | 5/2022 | Eckman et al. | |
| 11,420,756 | B1 | 8/2022 | Moy et al. | |
| 11,595,008 | B2 | 2/2023 | Jain et al. | |
| 11,646,501 | B2 | 5/2023 | Wu et al. | |
| 11,682,649 | B2 | 6/2023 | Babcock et al. | |
| 11,688,929 | B2 | 6/2023 | Charvat et al. | |
| 11,693,432 | B1 | 7/2023 | Clark et al. | |
| 11,733,372 | B1 | 8/2023 | Clark et al. | |
| 2003/0151556 | A1 | 8/2003 | Cohen | |
| 2006/0178142 | A1 | 8/2006 | Lovberg et al. | |
| 2019/0168870 | A1 * | 6/2019 | Li | G05D 1/0094 |
| 2021/0012520 | A1 * | 1/2021 | Zhou | G05D 1/0038 |

FOREIGN PATENT DOCUMENTS

| | | | |
|---|---|---|---|
| EP | 2879012 | A1 | 6/2015 |
| GB | 1164688 | A | 9/1969 |
| RU | 2735909 | C1 | 11/2020 |
| WO | 1992004698 | A1 | 3/1992 |
| WO | 1997033187 | A1 | 9/1997 |
| WO | 2000007677 | A1 | 2/2000 |
| WO | 2010138696 | A1 | 12/2010 |
| WO | 2012105973 | A1 | 8/2012 |
| WO | 2018218370 | A1 | 12/2018 |
| WO | 2020257859 | A1 | 12/2020 |

* cited by examiner

SYSTEM AND METHOD FOR POSITIONING ONE OR MORE UNMANNED AERIAL VEHICLES IN A FEATURELESS ENVIRONMENT

REFERENCE TO RELATED APPLICATIONS

The present application claims priority to and the benefit of Provisional Patent Application Ser. No. 63/449,090, filed Mar. 1, 2023 and entitled "SYSTEM AND METHOD FOR POSITIONING A SET OF UNMANNED AERIAL VEHICLES IN A FEATURELESS ENVIRONMENT," the entire contents of which are hereby incorporated by reference herein.

FIELD OF THE INVENTION

The present invention generally relates to a system and method for positioning one or more unmanned aerial vehicles in a featureless environment, or any environment not suitable for known absolute positioning systems.

BACKGROUND

Modern positioning systems typically use global position system(s) (GPS) for mapping and determining absolute position with respect to known features. However, in many environments, such as in the desert, over the open sea, on extraterrestrial bodies, underground, or in buildings, GPS may not be readily available. Traditional positioning techniques, such as dead reckoning and inertial navigation systems, are subject to numerous errors, including drift caused by environmental effects and sensor error. Weather and other environmental effects may also reduce the accuracy of GPS for determining absolute position. Further, such conventional techniques may not be effective in positioning autonomously controlled sets of unmanned aerial vehicles simultaneously.

Accordingly, it would be desirable to provide a positioning system that avoids these and other problems by which a set of unmanned aerial vehicles may accurately determine absolute positions of its component vehicles in real time in environments where GPS may not be available in order to direct the set of unmanned aerial vehicles to a target absolute position.

SUMMARY OF INVENTION

In view of the above, it is the object of the present disclosure to provide a system and apparatus to overcome the technological challenges faced in conventional unmanned aerial vehicle positioning systems.

In particular, it is an object to provide a system and method to allow a set of unmanned aerial vehicles to accurately determine absolute positions of its component vehicles in real time in environments where GPS may not be available in order to direct the set of unmanned aerial vehicles to a target absolute position.

It is a further object of the present disclosure to provide a system and method to direct a set of unmanned aerial vehicles to a target absolute position in in a featureless environment where GPS is unavailable, or an environment otherwise not suitable for known absolute positioning systems.

It is a further object of the present disclosure to provide a system and method to employ observed relative differences in absolute positions of members of a set of unmanned aerial vehicles in guiding movement of the set of unmanned aerial vehicles.

It is a further object of the present disclosure to engage in sequential movement of members of a set of unmanned aerial vehicles in order to more accurately control movement of the set of unmanned aerial vehicles towards a target absolute position.

In exemplary embodiments, a first unmanned aerial vehicle comprises: a) a first optical camera mounted on the first unmanned aerial vehicle and having a first field of view; b) a first flight controller; c) a processor operably connected to the first optical camera and the first flight controller; d) non-transitory computer readable memory operably connected to the processor and including processor executable code that when executed by the processor performs the steps of: (i) obtaining, from the first optical camera, a plurality of images, each image of the plurality of images having a first predetermined image pixel length in a first coordinate direction and a first predetermined image pixel width in a second coordinate direction orthogonal to the first coordinate direction, wherein the plurality of images includes a first image and a second image, wherein the first image is taken at a first time while the first unmanned aerial vehicle is at a first position, and includes a first image segment representing a second unmanned aerial vehicle in a first reference position defined by a first set of pixel coordinates, wherein at the first time, the first unmanned aerial vehicle is at a first altitude and the second unmanned aerial vehicle is at a second altitude, wherein the second image is taken at a second time, and includes a second image segment representing the second unmanned aerial vehicle in a second reference position defined by a second set of pixel coordinates, wherein at the second time, the first unmanned aerial vehicle is at a third altitude and the second unmanned aerial vehicle is at a fourth altitude, and wherein the second unmanned aerial vehicle comprises predetermined vehicle dimensions including a first predetermined vehicle length and a first predetermined vehicle width; (ii) determining a first distance travelled in a first direction by the second unmanned aerial vehicle by the steps of: (a) obtaining, based on the first image segment, a first vehicle pixel length of the second unmanned aerial vehicle and a first vehicle pixel width of the second unmanned aerial vehicle; (b) determining a first image length based on the first predetermined image pixel length, the first predetermined vehicle length, and the first vehicle pixel length; (c) determining a first image width based on the first predetermined image pixel width, the first predetermined vehicle width, and the first vehicle pixel width; (d) determining, based on the first set of pixel coordinates, the second set of pixel coordinates, the first predetermined image pixel length, the first image length, the first predetermined image pixel width, and the first image width, the first distance travelled in the first direction by the second unmanned aerial vehicle; (iii) storing in the non-transitory computer readable memory the first vehicle pixel length, the first vehicle pixel width, the first image length, the first image width, the first distance and the first direction; (iv) generating flight instructions based on the first distance travelled, the first direction, and one or more preprogrammed flight instructions; (v) transmitting to the first flight controller, the flight instructions, wherein the first flight controller generates a plurality of flight control signals in order to direct the first unmanned aerial vehicle to a target position at a fifth altitude based on the flight instructions; and wherein the first unmanned aerial vehicle is directed to the target position based on commands provided based on the flight instructions; and (vi) store updated position information of the first unmanned aerial vehicle associated with the target position.

In embodiments, the first image length is the product of the first predetermined vehicle length and the first predetermined image pixel length divided by the first vehicle pixel length.

In embodiments, the first image width is the product of the first predetermined vehicle width and the first predetermined image pixel width divided by the first vehicle pixel width.

In embodiments, the first distance travelled comprises a width-wise component and a lengthwise component, wherein the width-wise component is calculated according to the formula:

$$dx = \frac{M_{uX}}{P_{uX}}(p_{x2} - p_{x1})$$

wherein dx is the width-wise component of the first distance travelled in the first coordinate direction, $M_{uX}$ is the first predetermined vehicle width, $P_{uX}$ is the first vehicle pixel width, $p_{x2}$ is the width-wise component of the second set of pixel coordinates and $p_{x1}$ is the width-wise component of the first set of pixel coordinates, and wherein the lengthwise component is calculated according to the formula:

$$dy = \frac{M_{uY}}{P_{uY}}(p_{y2} - p_{y1})$$

wherein dy is the lengthwise component of the first distance travelled in the second coordinate direction, $M_{uY}$ is the first predetermined vehicle length, $P_{uY}$ is the first vehicle pixel length, $p_{y2}$ is the lengthwise component of the second set of pixel coordinates and $p_{y1}$ is the lengthwise component o of the first set of pixel coordinates.

In embodiments, the target position is stored as an approximate GPS location determined according to the formulas:

$$lat_2 = lat_1 + \frac{dy}{R}\left(\frac{180}{\pi}\right)$$

$$long_2 = long_1 + \frac{dx}{R\cos\left(\frac{\pi lat_1}{180}\right)}\left(\frac{180}{\pi}\right)$$

wherein $lat_2$ is the latitude of the target position, $long_2$ is the longitude of the target position, $lat_1$ is the latitude of an initial position, and $long_1$ is the longitude of the initial position, and wherein the second coordinate direction is north.

In embodiments, the first distance travelled in the first direction is further based on a first height differential and a second height differential, wherein the first height differential and second height differential are determined by the steps of: (a) obtaining, from the second image, a second vehicle pixel length of the second unmanned aerial vehicle and a second vehicle pixel width of the second unmanned aerial vehicle; (b) determining a second image length based on the first predetermined image pixel length, the first predetermined vehicle length, and the second vehicle pixel length; (c) determining the first height differential between the first unmanned aerial vehicle based on the first field of view and the first image length; and (d) determining the second height differential between the first unmanned aerial vehicle based on the first field of view and the second image length.

In embodiments, the predetermined vehicle dimensions are obtained from mission parameters stored in the non-transitory computer readable memory.

In embodiments, the non-transitory computer readable memory further includes processor executable code that when executed by the processor performs the steps of: (vii) identifying, using machine vision, the second unmanned aerial vehicle; and (viii) retrieving from the non-transitory computer readable memory the predetermined vehicle dimensions, wherein the predetermined vehicle dimensions corresponding to the second unmanned aerial vehicle.

In embodiments, the first unmanned aerial vehicle includes a second optical camera mounted on the first unmanned aerial vehicle.

The first unmanned aerial vehicle of claim 9, wherein at least one of the plurality of images is based upon an output of the second optical camera.

In embodiments, the first unmanned aerial vehicle maintains a first flight path at the first altitude based on the one or more preprogrammed flight instructions and wherein the second unmanned aerial vehicle maintains a second flight path at the second altitude based on one or more preprogrammed flight instructions.

In embodiments, at the commencement of step (i), the first unmanned aerial vehicle is stationary at the first altitude and the second unmanned aerial vehicle is stationary at the second altitude.

In embodiments, at the commencement of step (i), the first unmanned aerial vehicle is stationary at the first altitude and the second unmanned aerial vehicle is moving along the second flight path at a first velocity at the second altitude.

In embodiments, the position of the first unmanned aerial vehicle is known to a first user of a first remote control system.

In embodiments, the flight instructions are further based on a first velocity of the first unmanned aerial vehicle.

In embodiments, the one or more preprogrammed flight instructions include at least a target absolute position.

In embodiments, the one or more preprogrammed flight instructions include at least a first flight path and a first velocity.

In embodiments, the one or more preprogrammed flight instructions include at least a second flight path and a second velocity.

In embodiments, at least one of the plurality of images is a still frame of a video.

In embodiments, at least one of the plurality of images is a digital photograph.

In embodiments, the first image includes a first centroid located at the first set of pixel coordinates.

In embodiments, the first centroid is within a first reference zone.

In embodiments, the second image includes a second centroid located at the second set of pixel coordinates.

In embodiments, the second centroid is within a second reference zone.

In embodiments, the first set of pixel coordinates includes a pixel length coordinate and a pixel width coordinate.

In embodiments, the second set of pixel coordinates includes a pixel length coordinate and a pixel width coordinate.

In embodiments, the first unmanned aerial vehicle and the second unmanned aerial vehicle form a set of unmanned aerial vehicles.

In embodiments, the first altitude is the same as the third altitude.

In embodiments, the first altitude is different than the third altitude.

In embodiments, the second altitude is the same as the fourth altitude.

In embodiments, the second altitude is different than the fourth altitude.

In exemplary embodiments, a first unmanned aerial vehicle comprises: a) a first optical camera mounted on the first unmanned aerial vehicle and having a first field of view; b) a first flight controller; c) a processor operably connected to the first optical camera and the first flight controller; d) non-transitory computer readable memory operably connected to the processor and including processor executable code that when executed by the processor performs the steps of: (i) obtaining, from the first optical camera, a plurality of images, each image of the plurality of images having a first predetermined image pixel length in a first coordinate direction and a first predetermined image pixel width in a second coordinate direction orthogonal to the first coordinate direction, wherein the plurality of images includes a first image and a second image, wherein the first image is taken at a first time while the first unmanned aerial vehicle is at a first position moving at a first velocity, and includes a first image segment representing a second unmanned aerial vehicle in a first reference position defined by a first set of pixel coordinates, wherein at the first time, the first unmanned aerial vehicle is at a first altitude and the second unmanned aerial vehicle is at a second altitude, wherein the second image is taken at a second time, and includes a second image segment representing the second unmanned aerial vehicle in a second reference position defined by a second set of pixel coordinates, wherein at the second time, the first unmanned aerial vehicle is at a third altitude and the second unmanned aerial vehicle is at a fourth altitude, and wherein the second unmanned aerial vehicle comprises predetermined vehicle dimensions including a first predetermined vehicle length and a first predetermined vehicle width; (ii) determining a first distance travelled in a first direction by the second unmanned aerial vehicle by the steps of: (a) obtaining, based on the first image segment, a first vehicle pixel length of the second unmanned aerial vehicle and a first vehicle pixel width of the second unmanned aerial vehicle; (b) determining a first image length based on the first predetermined image pixel length, the first predetermined vehicle length, and the first vehicle pixel length; (c) determining a first image width based on the first predetermined image pixel width, the first predetermined vehicle width, and first vehicle pixel width; (d) determining, based on the first set of pixel coordinates, the second set of pixel coordinates, the first predetermined image pixel length, the first image length, the first predetermined image pixel width, the first image width, and the first velocity, the first distance travelled in the first direction by the second unmanned aerial vehicle; (iii) storing in the non-transitory computer readable memory the first vehicle pixel length, the first vehicle pixel width, the first image length, the first image width, the first distance and the first direction; (iv) generating flight instructions based on the first distance travelled, the first direction, and one or more preprogrammed flight instructions; (v) transmitting to the first flight controller, the flight instructions, wherein the first flight controller generates a plurality of flight control signals in order to direct the first unmanned aerial vehicle to a target position at a fifth altitude based on the flight instructions; and wherein the first unmanned aerial vehicle is directed to the target position based on commands provided based on the flight instructions; and (vi) store updated position information of the first unmanned aerial vehicle associated with the target position.

In embodiments, the first distance travelled comprises a width-wise component and a lengthwise component, wherein the width-wise component is calculated according to the formula:

$$dx = \frac{M_{uX}}{P_{uX}}(p_{x2} - p_{x1}) + v_x t + \frac{1}{2} a_x t^2$$

wherein dx is the width-wise component of the first distance travelled in the first coordinate direction, $M_{uX}$ is the first predetermined vehicle width, $P_{uX}$ is the first vehicle pixel width, $p_{x2}$ is the width-wise component of the second set of pixel coordinates, $p_{x1}$ is the width-wise component of the first set of pixel coordinates, t is the difference between the second time and the first time, $v_x$ (t) is the width-wise component of the first velocity, and $a_x$ is the width-wise component of an average acceleration of the first unmanned aerial vehicle; and wherein the lengthwise component is calculated according to the formula:

$$dy = \frac{M_{uY}}{P_{uY}}(p_{y2} - p_{y1}) + v_y t + \frac{1}{2} a_y t^2$$

wherein dy is the lengthwise component of the first distance travelled in the second coordinate direction, $M_{uY}$ is the first predetermined vehicle length, $P_{uY}$ is the first vehicle pixel length, $p_{y2}$ is the lengthwise component of the second set of pixel coordinates, $p_{y1}$ is the lengthwise component of the first set of pixel coordinates on, t is the difference between the second time and the first time, $v_y$ (t) is the lengthwise component of the first velocity, and $a_y$ is the lengthwise component of an average acceleration of the first unmanned aerial vehicle.

In embodiments, the first unmanned aerial vehicle maintains a first flight path at the first altitude based on the one or more preprogrammed flight instructions and wherein the second unmanned aerial vehicle maintains a second flight path at the second altitude based on one or more preprogrammed flight instructions.

In embodiments, the commencement of step (i), the first unmanned aerial vehicle is moving along the first flight path at the first velocity at the first altitude and the second unmanned aerial vehicle is stationary at the second altitude.

In embodiments, at the commencement of step (i), the first unmanned aerial vehicle is moving along the first flight path at the first velocity at the first altitude and the second unmanned aerial vehicle is moving along the second flight path at a second velocity at the second altitude.

In embodiments, the flight instructions are further based on a measured wind speed.

In embodiments, an exemplary system may include a first unmanned aerial vehicle configured to direct a set of unmanned aerial vehicles to a target absolute position, wherein the unmanned aerial vehicle may include: (a) a first optical camera payload mounted in the first unmanned aerial vehicle and having a first field of view; (b) a first flight controller; (c) a processor operably connected to the first optical camera payload and the first flight controller; and (d) memory operably connected to the processor and including processor executable code that when executed by the processor performs the steps of: (1) obtaining, at a first time, from the first optical camera payload when the first unmanned aerial vehicle is located at a first absolute position at a first altitude, first relative position information in the first field of view associated with a second unmanned aerial vehicle at a second altitude, wherein the first field of view includes a two-dimensional coordinate plane, and wherein the set of unmanned aerial vehicles includes the first unmanned aerial vehicle and the second unmanned aerial vehicle; (2) obtaining, at a second time, from the first optical camera payload, second relative position information in the first field of view associated with the second unmanned aerial vehicle; (3) calculating, at a third time, second absolute position information associated with the first unmanned aerial vehicle based on the first relative position information, the second relative position information, the first absolute position information, the first time, the second time, and one or more preprogrammed flight instructions; (4) transmitting to a first flight controller of the first unmanned aerial vehicle, the second absolute position information and the second relative position information; wherein the first flight controller generates a plurality of flight control signals in order to direct the first unmanned aerial vehicle to a third absolute position at the first altitude in a first direction and at a first velocity based on the second absolute position information, the second relative position information, and the one or more preprogrammed flight instructions; and wherein the first unmanned aerial vehicle is directed to the third absolute position based on commands provided based on the flight instructions.

In embodiments, the second unmanned aerial vehicle may have a second optical camera payload having a second field of view and mounted to the second unmanned aerial vehicle.

In embodiments, the first unmanned aerial vehicle may maintain a first flight path at the first altitude based on the one or more preprogrammed instructions and the second unmanned aerial vehicle may maintain a second flight path at the second altitude based on one or more preprogrammed instructions. In embodiments, the first altitude may be greater than the second altitude.

In embodiments, the first and second unmanned aerial vehicles may be stationary or in motion at the commencement of step (1). For example, at the commencement of step 1, the first unmanned aerial vehicle may be stationary at the first altitude and/or may be moving along the first flight path at the first velocity, or a second velocity, at the first altitude, and the second unmanned aerial vehicle may be stationary at the second altitude, and/or may be moving along the second flight path at the second velocity at the second altitude.

In embodiments, the calculating step (3) may be based on first relative position information, the second relative position information, the first absolute position information, the first time, the second time, the one or more preprogrammed flight instructions, and first velocity information associated with the first velocity of the first unmanned aerial vehicle. In embodiments, the calculating step (3) may be based on first relative position information, the second relative position information, the first absolute position information, the first time, the second time, the one or more preprogrammed flight instructions, and second velocity information associated with the second velocity of the second unmanned aerial vehicle.

In embodiments, the one or more preprogrammed flight instructions may include one or more of: at least a target absolute position associated with the set of unmanned aerial vehicles, at least the first flight path and the first velocity, and include at least the second flight path and the second velocity.

BRIEF DESCRIPTION OF THE DRAWINGS

The above and related objects, features and advantages of the present disclosure will be more fully understood by reference to the following detailed description of the preferred, albeit illustrative, embodiments of the present invention when taken in conjunction with the accompanying figures, wherein.

DETAILED DESCRIPTION OF THE EXEMPLARY EMBODIMENTS

The present invention generally relates to a system and method of determining an absolute position of a set of unmanned aerial vehicles in a featureless environment, for example, unmapped desert or the open sea, or an environment otherwise not suitable for known absolute positioning systems.

Figure 1:
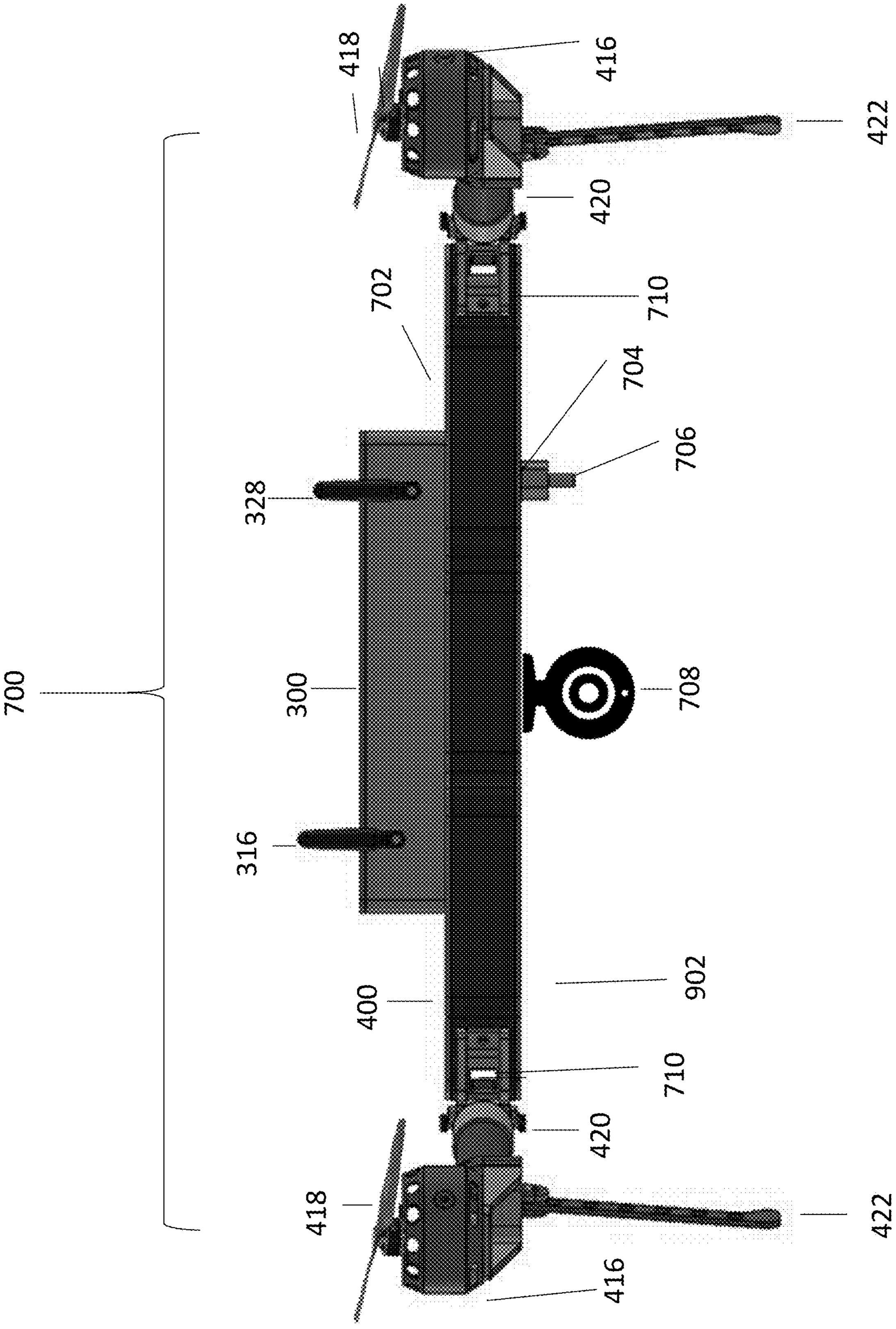
FIG. 1 is an illustration depicting an unmanned aerial vehicle which uses optical navigation in accordance with embodiments of the present invention.

According to embodiments of the present invention, as shown in FIG. 1, an unmanned aerial vehicle 700 (sometimes referred to as a "UAV" throughout) may use optical navigation in accordance with embodiments of the present invention. In embodiments, the unmanned aerial vehicle 700 may be provided with an optical camera payload 708. In embodiments, the optical camera payload 708 comprises an optical camera. In embodiments, the unmanned aerial vehicle 700 may include a first enclosure 300 positioned on top of a second enclosure 400. A power source (e.g., battery with one or more cells, not shown) may be connected to the second enclosure 400 via an input power interface 704 and an input power filter 706. In embodiments, a plurality of motors 416 may drive propellors 418 which may be mounted on respective mounting rods 420 which are connected to a main frame 902 of the unmanned aerial vehicle 700, for example by connectors 710. In embodiments, the main frame 902 may include the second enclosure 400, as well as the first enclosure 300. In embodiments, the first enclosure 300 of the unmanned aerial vehicle 700 may house electronic components (see, e.g., FIG. 2) which may be in contact with and receive input from optical camera payload 708 in order to control the flight and flight path of the unmanned aerial vehicle 700 including by operating the motors 416. In embodiments, support rods 422 may support the frame 902. Additional mission or other payloads (not shown), in addition to the optical camera payload, may also be carried on or within the unmanned aerial vehicle 700.

In accordance with embodiments of the present invention, electronic components may be segregated into at least two separate chambers, enclosures 300 and 400. In embodiments, the first enclosure 300, for example, may include electronic components used for communication and navigation of the unmanned electronic vehicle 700. In embodiments, the second enclosure 400, for example, may include electronic components used to drive the motors 416 and power the unmanned electronic vehicle 700. It will be appreciated by those skilled in the art that modifications to the design and components shown may be made without departing from the letter and spirit of the present invention.

In addition, other components of the unmanned aerial vehicle, e.g., an antenna or antennas 316, 328, and one or more batteries or other power source, not shown, to name a few, may be located inside or outside the enclosures 300, 400 and operatively connected to electronic components positioned therein.

Figure 2:
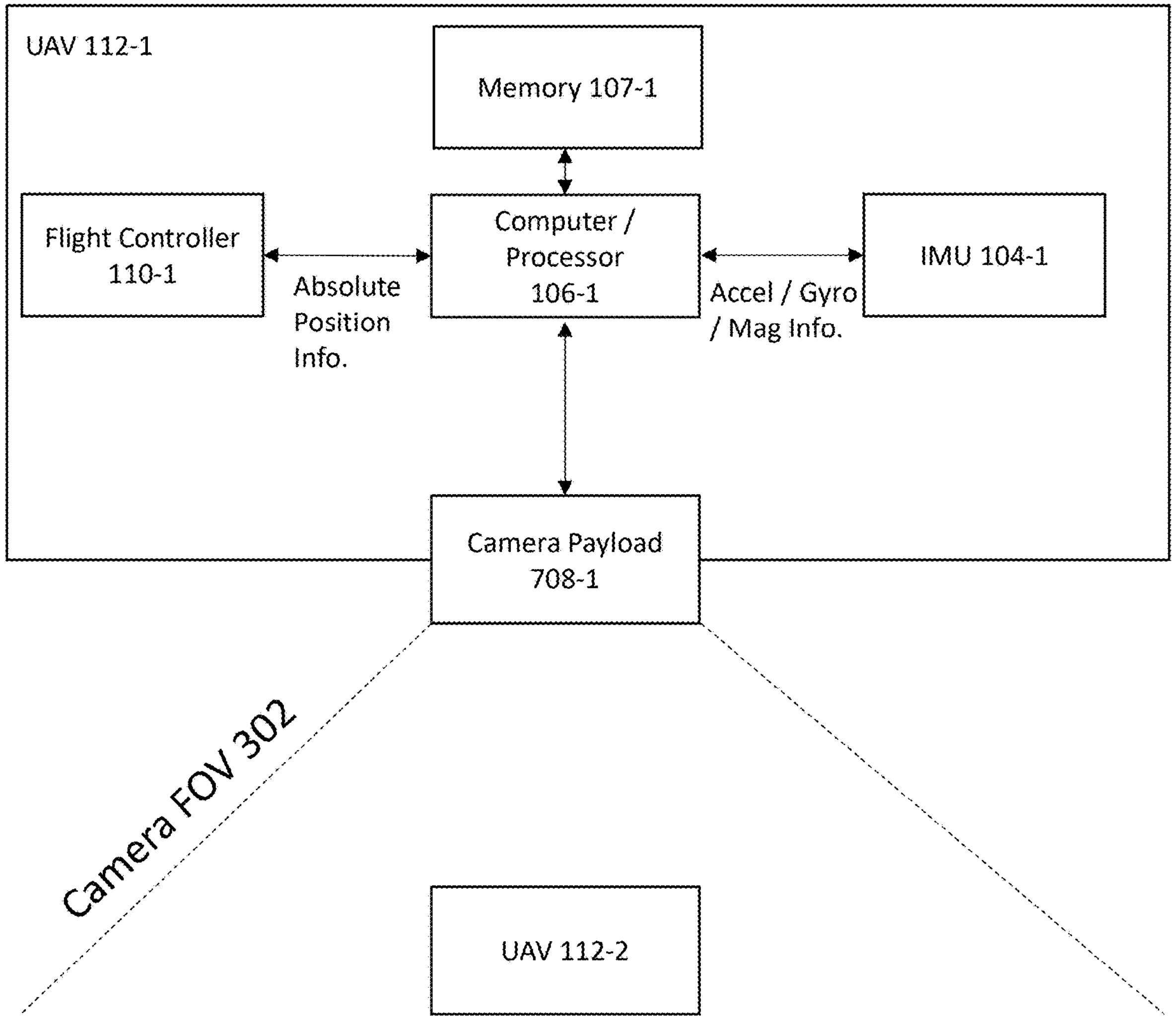
FIG. 2 is a schematic diagram of an unmanned aerial vehicle which uses optical navigation in accordance with embodiments of the present invention.

By way of illustration, FIG. 2 shows a schematic diagram of an unmanned aerial vehicle 112-1, which may be similar to the unmanned aerial vehicle 700, and which uses optical navigation in accordance with embodiments of the present invention, including exemplary electronic components thereof, as well as relative positioning of multiple unmanned aerial vehicles (UAVs). In embodiments, the exemplary UAV 112-1 may include a flight controller 110-1, which may be used to control flight of the UAV 112-1 or other UAVs from the set of UAVs via control of the motors 416 (e.g. as shown in FIG. 1) of the respective UAV or UAVs. In embodiments, the exemplary UAV 112-1 may also contain a computer or processor 106-1, which may be used to provide absolute position information, for example relating to first UAV 112-1, second UAV 112-2, or a set of UAVs including at least UAVs 112-1/112-2 to the flight controller 110-1. The UAV 112-1 may also include an inertial measurement unit (IMU) 104-1 or other movement or positional sensing device or devices, which may provide movement or positional sensing information, such as, for example, acceleration information, gyroscopic information, and magnetic or magnetometer information/facing information, to the computer or processor 106-1. In embodiments, the UAV 112-1 may be configured to collect a variety of types of information, such as information related to global positioning system coordinates, images, radar, radio frequency, ultrawideband, altitude, range using ultrawideband, altitude, heading, and passage of time, to give a few examples. In embodiments, the UAV 112-1 includes one or more altimeters, such as a MEMS pressure sensor (e.g., the MPL3115a2, to give an example), a laser altimeter (e.g., the SF11/C laser altimeter, to give an example), and/or a microLiDAR sensor (e.g., the LW20/C microLiDAR, to give an example).

An optical camera payload 708 comprising at least one optical camera (e.g. corresponding to that shown in FIG. 1) may also be positioned on the UAV 112-1, and may be configured to provide image or video information or information sensed in other ways such as by laser, radar, sonar, ultrawideband, and/or range sensors, for example showing the positioning of second UAV 112-2 within a camera field of view ("FOV") 302, to the computer/processor 106-1, using any suitable communication equipment. For example, in embodiments, the optical camera payload 708 includes an optical camera with a camera having a wide angle field of view (e.g., the RunCam Eagle 16:9 with a 130 Degree FOV lens, a camera with a TeSoo Optical Lens, and/or a Raspberry Pi Wide Angle NoIR camera, to give a few nonlimiting examples). In embodiments, the field of view is defined by one or more angles in various directions (e.g., the field of view may be 60 degrees, 75 degrees, 90 degrees, 110 degrees, 130 degrees, 150 degrees in the vertical, horizontal, and diagonal directions, to give a few examples), aspect ratios, and/or image magnification settings. FIGS. 3 and 3A and FIGS. 4 and 4A illustrate exemplary illustrations of the camera FOV of the optical camera payload 708.

Figure 3:
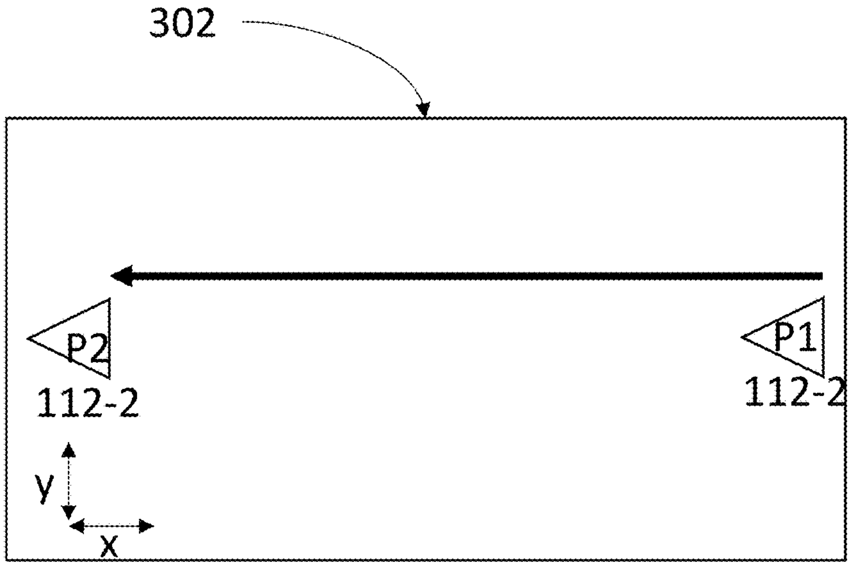
FIG. 3 is an illustration depicting the field of view of a camera payload of an unmanned aerial vehicle using optical navigation in accordance with embodiments of the present invention, as well as the positioning of a second unmanned aerial vehicle relative to this field of view and a directional flight path.
Figure 4:
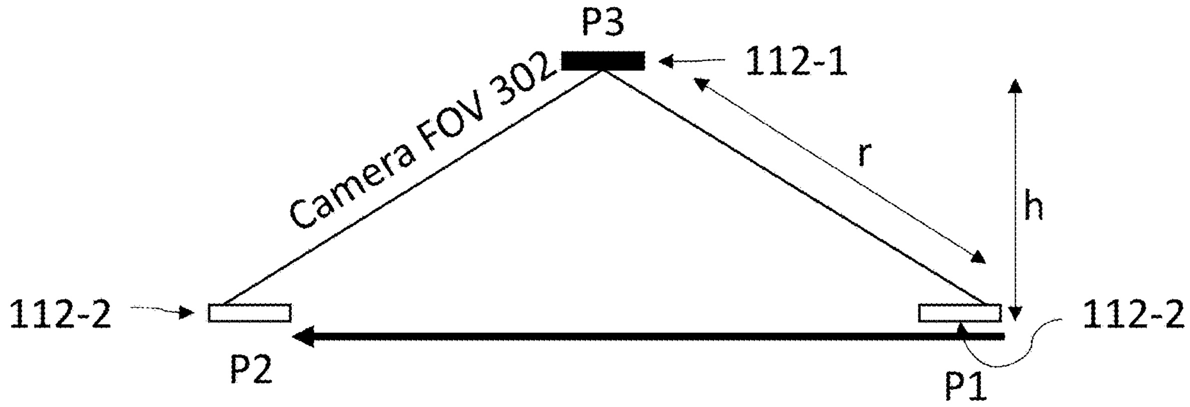
FIG. 4 is an illustration a side view of a set of unmanned aerial vehicles using optical navigation in accordance with embodiments of the present invention including a side view of the field of view and unmanned aerial vehicles shown in FIG. 3.
Figure 3A:
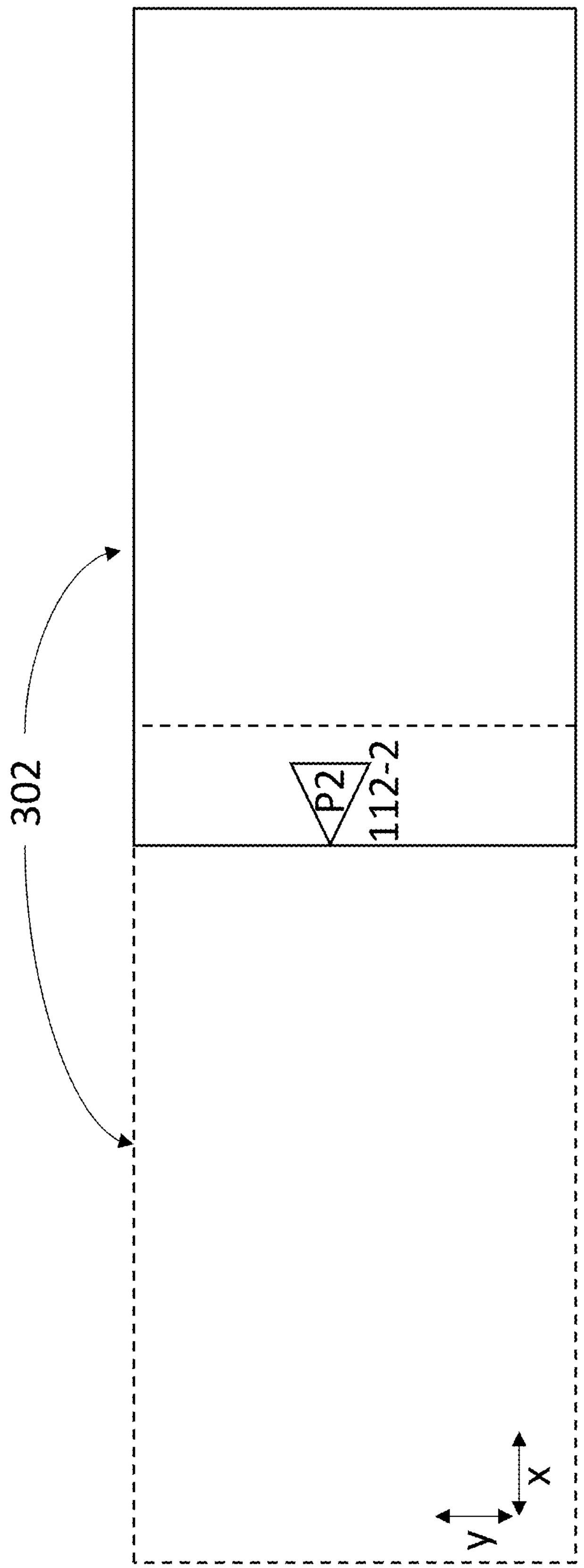
FIG. 3A illustrates a top-down perspective of the FOV of the optical camera for use in optical navigation in accordance with embodiments of the present invention as an unmanned aerial vehicle moves along a directional flight path.
Figure 4A:
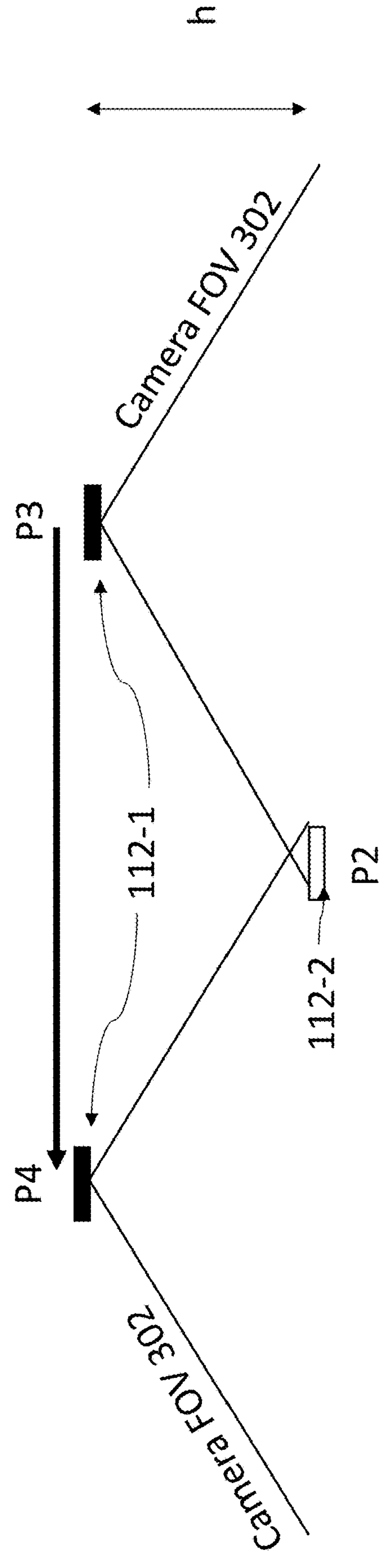
FIG. 4A illustrates a side perspective view of a plurality of unmanned aerial vehicles using optical navigation as an unmanned aerial vehicle moves along a directional flight path in accordance with embodiments of the present invention.

FIG. 3 illustrates a top-down perspective of the FOV of the optical camera for use in optical navigation in accordance with embodiments of the present invention, as well as the positioning of the first unmanned aerial vehicle 112-1 relative to this field of view and a directional flight path for a second unmanned aerial vehicle 112-2. FIG. 4 illustrates a side perspective view of a set of unmanned aerial vehicles 112-1, 112-2 using optical navigation in accordance with embodiments of the present invention. FIG. 3A illustrates a top-down perspective of the FOV of the optical camera for use in optical navigation in accordance with embodiments of the present invention as an unmanned aerial vehicle (e.g., first unmanned aerial vehicle 112-1) moves along a directional flight path. FIG. 4A illustrates a side perspective view of a plurality of unmanned aerial vehicles (e.g., UAV 112-1 and 112-2) using optical navigation as an unmanned aerial vehicle moves along a directional flight path in accordance with embodiments of the present invention. It will be understood that UAVs such as shown in FIGS. 1 and 2 may be used in these configurations.

In accordance with embodiments of the present invention, the first UAV 112-1 may direct movement of second UAV 112-2 relative to its position and camera FOV, for example along a flight path (shown with an arrow from position P1 to P2) from one side or portion of the camera FOV, at a position P1, to a second side or portion of the camera FOV, at a position P2. In embodiments, positions P1 and P2 are relative positions within the camera FOV. In embodiments, control signals may be provided by the flight controller 110-1 and sent to the second UAV 112-2 via the antenna(s) 316, 328 or any other suitable device. For example, the second UAV 112-2 may travel from a position P1 (at approximately 3 o'clock) to a position P2 (at approximately 9 o'clock) in the field of view as shown in FIG. 3. In embodiments, the second UAV 112-2 may move from position P1 to position P2 without receiving commands from the first unmanned aerial vehicle 112-1, for example, based on one or more of pre-programmed flight instructions, a position of the first unmanned aerial vehicle obtained in accordance with the present invention, control signals received from a third unmanned aerial vehicles, and control signals received from a remote controller, to give a few examples.

In embodiments, the UAV 112-2 has a plurality of vehicle dimensions, including a vehicle length and a vehicle width. In embodiments, the vehicle dimensions of the second UAV 112-2 are stored in non-transitory computer readable memory accessible by a processor of the first UAV 112-1. In embodiments, the plurality of vehicle dimensions are set by mission parameters. In embodiments, the plurality of vehicle dimensions are obtained based on communications from the second UAV 112-1. In embodiments, the vehicle dimensions are determined by using a form of machine vision, such as image recognition using identifiable aspects of the second UAV 112-2, to give an example. In embodiments, the vehicle dimensions are determined based on one or more of: images from the optical camera payload, ultrawideband ranging sensors, and readings from one or more altimeters.

As shown in FIG. 4, a height h or ascertained may be known, representing a relative difference in altitude between the first UAV 112-1 at a position P3 and second UAV 112-2. In embodiments, h represents the distance between the first UAV 112-1 (e.g., at position P3, to give an example) and the second UAV 112-2 (e.g., at position P1 and/or position P2, to give an example) in a direction orthogonal to a plane formed by the camera FOV. In embodiments of the invention, where the height h is known or inferred and the angle of the camera FOV is known, the distance travelled by the second UAV 112-2 relative to the first UAV 112-1 when it traverses a flight path between two points in the field of view may be calculated based on the height h. This height h may be known or calculated for example based on one or more altimeter (which may be, for example, barometric, radar based or laser based, to name a few) within or on the respective UAV, images showing the apparent size of the second UAV 112-2 (for example at a known point in the flight path for, e.g., directly under the first UAV 112-1), distance measuring devices such as laser rangefinders, or other devices which may be known in the art for determining relative distances). In embodiments, a suitable system or method for maintaining altitude may be used. In embodiments, at least one UAV may be programmed to maintain a set or predetermined altitude or height from ground so that h will be known or more readily or accurately determined. In embodiments, each UAV of the set of UAVs may be programmed to maintain one or more predetermined altitudes or heights from ground. In embodiments, one or more of UAVs may maintain variable altitudes or heights from the ground. In embodiments, h changes over time, for example, as the first UAV 112-1 and/or the second UAV 112-2 move. In embodiments, the first UAV 112-1 and/or the second UAV 112-2 may store h associated with various points in time as time series data.

In embodiments, a distance r between the first unmanned aerial vehicle 112-1 and the second unmanned aerial vehicle is obtained, for example, based on ultrawideband sensing, h, the field of view, one or more predetermined vehicle dimensions (e.g., vehicle dimensions determined by the first UAV 112-1 before the distance between P1 and P2 is determined), and/or the distance between P1 and P2, to give a few examples. In embodiments, ultrawideband sensing may be used as taught by U.S. Pat. No. 11,733,372 ("System and Method for Dynamic Two-Way Ranging Using Unmanned Aerial Vehicles") the entirety of which is incorporated herein by reference. In embodiments, r changes over time, for example, as the first UAV 112-1 and/or the second UAV 112-2 move. In embodiments, the first UAV 112-1 and/or the second UAV 112-2 may store r associated with various points in time as time series data. In embodiments, the first unmanned aerial vehicle 112-1 may use r as part of a determination of h, the size of objects in the field of view (e.g., unmanned aerial vehicle UAV 112-2), the position of objects in the field of view (e.g., P1 and P2), and distances travelled, to give a few examples.

In accordance with embodiments of the present invention, the distance between P1 and P2 may be based on a plurality of images obtained from an optical camera of the first unmanned aerial vehicle and one or more of: one or more predetermined vehicle dimensions and the FOV, one or more predetermined vehicle dimensions and h, r and h, and r (as a function of time). In embodiments, the distance between P1 and P2 may be further based on the movement, acceleration, and/or orientation of the first UAV 112-1 and the second UAV 112-2.

In embodiments, in addition to the second UAV 112-2 moving from P1 to P2, the first UAV 112-1 may move, concurrently or after the movement of second UAV 112-2, to a position ahead of the second UAV 112-2, in effect "leap-frogging" the second UAV 112-2. During this movement, the first UAV 112-1 may maintain its relative altitude and may use the positioning of the second UAV 112-2 as determined by input from the camera payload 708 to stay on course, and to reset second UAV 112-2 to a position behind the first UAV 112-1 along the flight path. For example, as shown in FIG. 3A and FIG. 4A, in embodiments, as the first UAV 112-1 moves from relative position P3 to relative position P4, the camera FOV 302 shifts as well. In embodiments, this process may be repeated an arbitrary number of times. For example, the process may be repeated along a flight path until a target destination, for example as stored in memory associated with the computer/processor 106-1 or flight controller 110-1, is reached by the set of UAVs. In embodiments, an arbitrary number of UAVs may form or be a part of the set of UAVs and may all be moved, for example with a first subset of the set moving first and a second subset moving sequentially thereafter. In embodiments, more than one subset of UAVs may move at a given time, and the relative positions of the various UAVs may be tracked and used to calculate their absolute positions.

Figure 5:
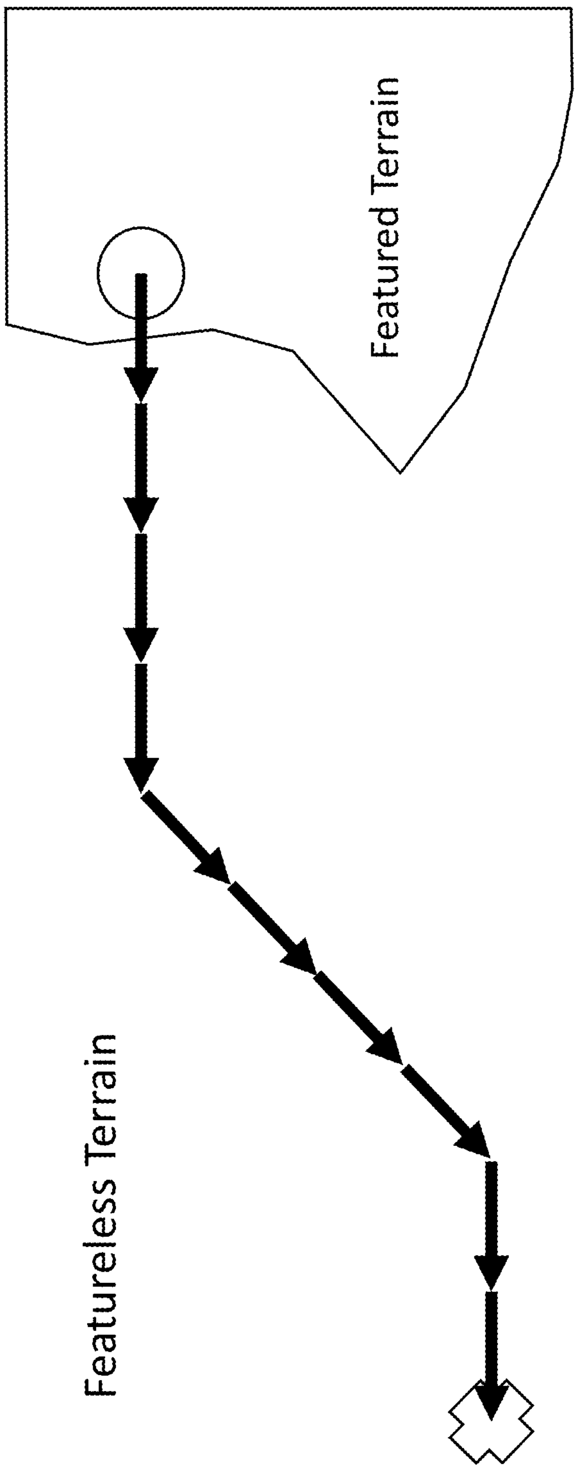
FIG. 5 is an illustration depicting a flight path for a set of unmanned aerial vehicles using optical navigation in accordance with embodiments of the present invention.

FIG. 5 is an illustration depicting a flight path for a set of unmanned aerial vehicles, for example, made up of first UAV 112-1 and second UAV 112-2, and in certain additional embodiments, additional UAVs, using optical navigation in accordance with embodiments of the present invention. In embodiments, one or more of the UAVs 112-1, 112-2 may track, for example, using memory associated with computer/processor 106-1, a route along a flight path that involves a plurality of segments or "hops". As shown, the flight path may traverse various kinds of terrain, such as featured terrain where a location may be directly observed or determined, and featureless terrain where mere visual or other analysis of the environment is insufficient to accurately determine a location.

In embodiments, in accordance with embodiments of the present invention, each segment or certain segments of the flight path towards a target, such as shown in FIG. 5, may involve movement if the second UAV 112-2 under inspection of camera payload 708, as generally discussed above in connection with FIGS. 3, 3A, 4 and 4A.

In embodiments, as can be seen in FIG. 5, angular course corrections may be made, including in featureless terrain. In embodiments, such angular course corrections may be made by the second UAV 112-2 being instructed to travel along a "hop" that ends at a different specified end position P2 as shown in FIG. 3, for example, at or towards a specified corner of the camera FOV. In embodiments, such movement may be observed by the camera of the first UAV 112-1 so as to better ensure accuracy of the movement. Then, in embodiments, the first UAV 112-1 may proceed in the direction of the second UAV 112-2, thereby achieving an angular course correction.

In embodiments, such angular course corrections may be performed, alternately or additionally to the approach as discussed above, through the use of observed data from IMU 104-1 in conjunction with the computer/processor 106-1 and flight controller 110-1 to control operation of the engines 416, or based on observing movement within the camera FOV of a feature, where available, of the terrain, during an angular movement. The method for the angular course correction may be chosen based on availability of additional visible UAVs from the set of UA Vs 112-1, 112-2 and availability of features of the terrain.

For example, in embodiments, data from the IMU 104-1 may be used by the computer/processor 106-1 and the flight controller 110-1 to calculate the relative altitude, velocity and position of any of the UAVs, such as UAVs 112-1 and 112-2, from the set of UAVs. In one such example, the IMU 104-1 may provide to the processor, the acceleration of a given UAV. In embodiments, this data may then be used by the computer/processor 106-1, to calculate velocity and position. This data may be compared with other data associated with the position of UAVs 112-1 and 112-2 to make course corrections.

Figure 6:
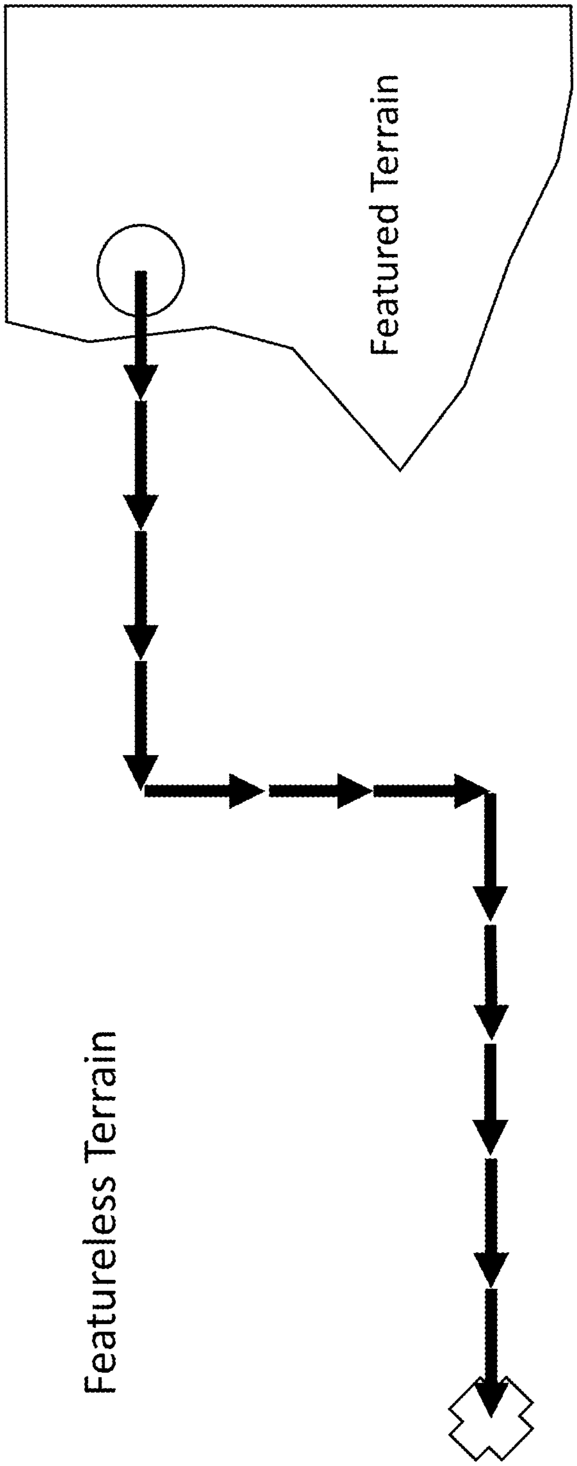
FIG. 6 is an illustration depicting an additional flight path for a set of unmanned aerial vehicles using optical navigation in accordance with embodiments of the present invention.

FIG. 6 is an illustration depicting an additional flight path for a set of unmanned aerial vehicles using optical navigation in accordance with embodiments of the present invention. In embodiments, as can be seen in FIG. 6, angular course corrections may be made involving right angles. In embodiments, the second UAV 112-2 may be instructed to travel to 6 o'clock or 12 o'clock, with respect to the camera FOV shown in FIG. 3, for example. It will be appreciated that any desired angular course correction necessary to travel along a predetermined or real-time determined route may be achieved by selectively determining where second UAV 112-2 will travel relative to first UAV 112-1 during a "hop."

It will be understood, in embodiments of the present invention, that any features described with respect to a particular UAV from amongst the first or second UAVs 112-1, 112-2, may be applied with respect to different or other UAVs, or in one or more or all of members of a set of 2, 3, 4, 5, 6, 7, 8, 9, 10 or more UAVs.

Figure 7:
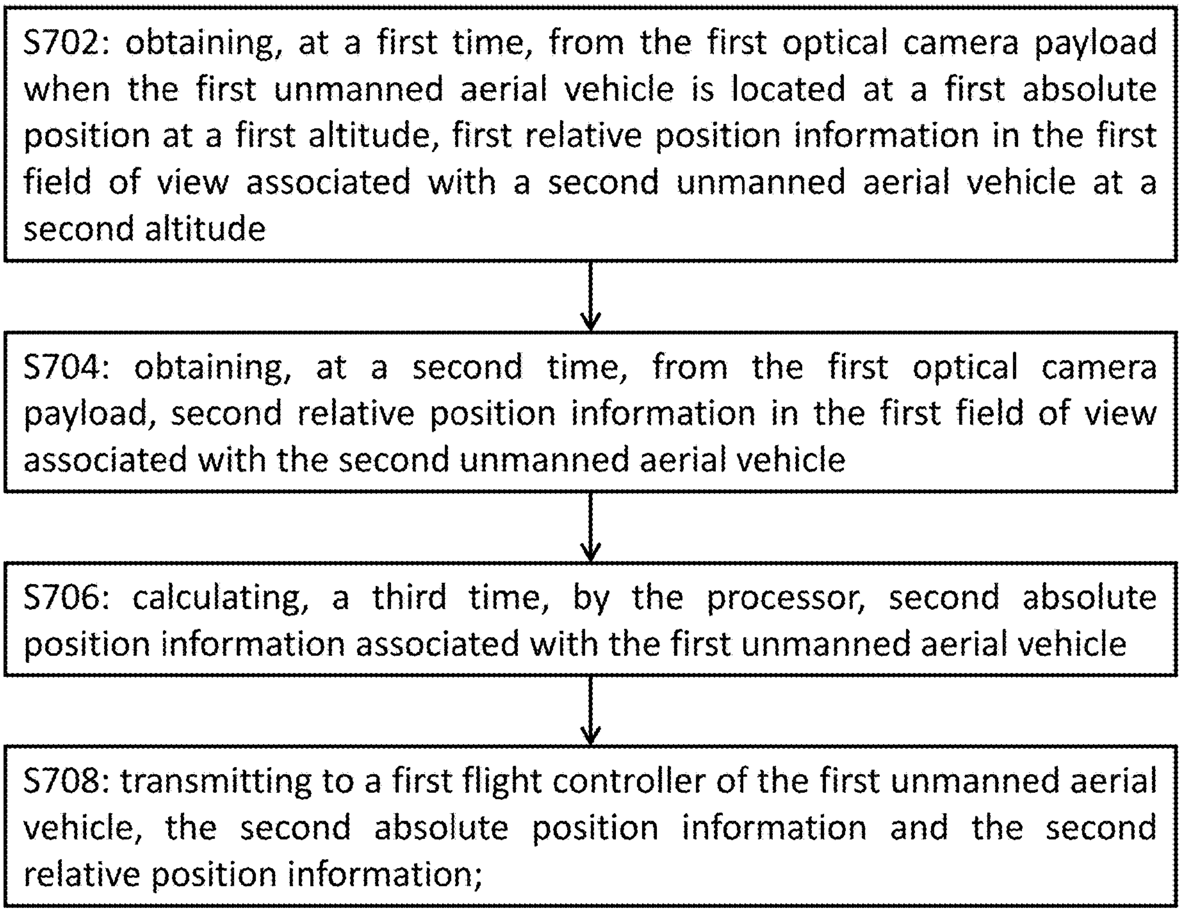
FIG. 7 is an exemplary flow chart of a method of directing unmanned aerial vehicles in accordance with embodiments of the present invention.

FIG. 7 illustrates an exemplary flow chart of a method that may be used to direct the set of unmanned aerial vehicles 112-1, 112-2, including to a target absolute position. In embodiments, the first unmanned aerial vehicle 112-1 may be configured, including via processor executable code stored in non-tangible computer readable memory associated with the computer/processor 106-1 (e.g., memory 107-1), the flight controller 110-1, or in a combination thereof, that, when executed by the computer/processor 106-1, may direct the set of unmanned aerial vehicles 112-1, 112-2, or members of such set, to a target absolute position.

At Step S702 of FIG. 7, a processor 106-1 of the first unmanned aerial vehicle 112-1 may obtain from a first optical camera payload 708, which may be mounted on the first unmanned vehicle 112-1 and which may have a first field of view, first relative position information in the first field of view associated with a second unmanned aerial vehicle 112-2 relative to the first field of view. The first unmanned aerial vehicle 112-1 may be located at a first absolute position at a first altitude. The second unmanned aerial vehicle 112-2 may be at a second altitude. In embodiments, the second altitude may be higher than, or alternately lower than, the first altitude. In embodiments, the first optical camera payload 708 may be mounted below the first body of the first aerial vehicle 112-1, or above it. In embodiments, camera payloads may be mounted to provide fields of view oriented on both sides or either side, so as to simultaneously or selectably provide image or video or other data to processor 106-1.

In embodiments, the first field of view may be or include a two-dimensional coordinate plane. In embodiments, the first field of view may be associated with a different coordinate system, such as a polar coordinate system or a three-dimensional coordinate system incorporating distance measurements associated with height along with two dimensional data. In embodiments, the set of unmanned aerial vehicles may include the first unmanned aerial vehicle 112-1 and the second unmanned aerial vehicle 112-2, or may include 1, 2, 3, 4, 5, 6, 7, 8 or more additional unmanned aerial vehicles as well.

In certain additional embodiments, the second unmanned aerial vehicle 112-2 or another unmanned aerial vehicle or vehicles may include a second optical camera payload 708 having a second field of view and mounted on the second unmanned aerial vehicle 112-2 or such other vehicle or vehicles.

In embodiments, the first unmanned aerial vehicle 112-1 may maintain a first flight path at the first altitude based on preprogrammed instructions. In embodiments, the second unmanned aerial vehicle 112-2 may maintain a second flight path at the second altitude, which may also be based on the same or different preprogrammed instructions. In embodiments, the first altitude may be greater than the second altitude. In other embodiments, the first altitude may be less than the second altitude.

In embodiments, at the beginning of step S702, the first unmanned aerial vehicle 112-1 may be stationary at the first altitude. In further embodiments, at this time the second unmanned aerial vehicle 112-2 may also be stationary at the second altitude. In embodiments, the second unmanned aerial vehicle 112-2 may be moving along a second flight path, for example at a first velocity at the second altitude.

In embodiments, at the beginning of step S702, the first unmanned aerial vehicle 112-1 may be moving along a first flight path at a first velocity at the first altitude. In embodiments, at this time, the second unmanned aerial vehicle 112-2 may be stationary at the second altitude. In embodiments, the second unmanned aerial vehicle may be moving along a second flight path at the first velocity at the second altitude. In embodiments, the second unmanned aerial vehicle 112-2 may be moving along a second flight path at another velocity, such as the second velocity, or a third velocity, at the second altitude.

In some embodiments, the first absolute position of the first unmanned aerial vehicle 112-1 is provided by the set of unmanned aerial vehicles to a first user of a first remote control system. For example, a human or algorithmic controller may have access through a remote computer network in communication with one or more unmanned aerial vehicles of the set of unmanned aerial vehicles through satellite communications, direct radio frequency, optical signaling, or other communications means which are known in the art.

In embodiments, in Step S704, the processor 106-1 of the first unmanned aerial vehicle 112-1 may obtain, at a second time, which may be different than the first time, from the first optical camera payload 708, second relative position information associated with the second unmanned aerial vehicle 112-2 relative to the first field of view. In embodiments, the second unmanned aerial vehicle 112-2 may be at the second altitude.

In embodiments, in Step S706, at a third time, the processor 106-1 may calculate second absolute position information associated with the first unmanned aerial vehicle 112-1. For example, such second absolute position information may relate to the absolute position of the first unmanned aerial vehicle after the second time. In embodiments, this calculating may be performed by the processor 106-1 according to a formula. In embodiments, the formula is Equation (1):

$$P_{A2} = (P_{R2} - P_{R1}) + P_{A1} \tag{1}$$

where $P_{A2}$ is the second absolute position information associated with the first unmanned aerial vehicle, $P_{A1}$ is the first absolute position information associated with the first unmanned aerial vehicle, $P_{R2}$ is the second relative position, at a second time, in the first field of view associated with the second unmanned vehicle, and $P_{R1}$ is the first relative position, at a first time, in the first field of view associated with the second unmanned aerial vehicle.

In embodiments, this calculating may be based on, any one or more of: (i) the first relative position information, (ii) the second relative position information, (iii) the first absolute position information, (iv) the first time, (v) the second time. In embodiments, the calculating may be based on the preprogrammed instructions, for example, the preprogrammed instructions as they relate to control of the engines 416 to travel along a flight path at a particular speed. In certain embodiments, the preprogrammed instructions may include at least one of: (i) a target absolute position associated with the set of unmanned aerial vehicles, (ii) a first flight path of the first unmanned aerial vehicle and the second velocity of the first unmanned aerial vehicle, and (iii) a second flight path of the second unmanned aerial vehicle and the first velocity of the second unmanned aerial vehicle. In embodiments, the second velocity may be the same as the first velocity. In embodiments, the second velocity may be different from the first velocity. In embodiments, the calculation may be further based on one or more of: (i) second velocity information associated with the second velocity of the first unmanned aerial vehicle, and (ii) first velocity information associated with the first velocity of the second unmanned aerial vehicle. In embodiments, once an absolute position is calculated for any single unmanned aerial vehicle, such as, for example, UAV 112-1, an absolute position for any other unmanned aerial vehicle in the set of unmanned aerial vehicles, such as, for example, UAV 112-2, may be calculated based on, for example, the relative position of the other unmanned aerial vehicle in relation to the single unmanned aerial vehicle for which the absolute position was calculated.

In embodiments, in Step S708, the processor 106-1 may transmit to a first flight controller 110-1 of the first unmanned aerial vehicle 112-1 information. For example, one or both of the second absolute position information and the second relative position information may be provided to the first flight controller 110-1 by the processor 106-1.

In embodiments, the first flight controller 110-1 of the first unmanned aerial vehicle 112-1 may generate flight control signals. In embodiments, such flight control signals may be used to direct the first unmanned aerial vehicle 112-1. This direction may be to a second absolute position at the first altitude in a first direction and at a first velocity based on one or more of the second absolute position information, the second relative position information, and the preprogrammed instructions. In embodiments, the second absolute position may be at a height other than the first height.

In embodiments, at a fourth time, the first flight controller 110-1 may direct the first unmanned aerial vehicle 112-1 based on the flight control signals. In embodiments, the first unmanned aerial vehicle 112-1 may be directed to or toward the second absolute position.

Figure 8:
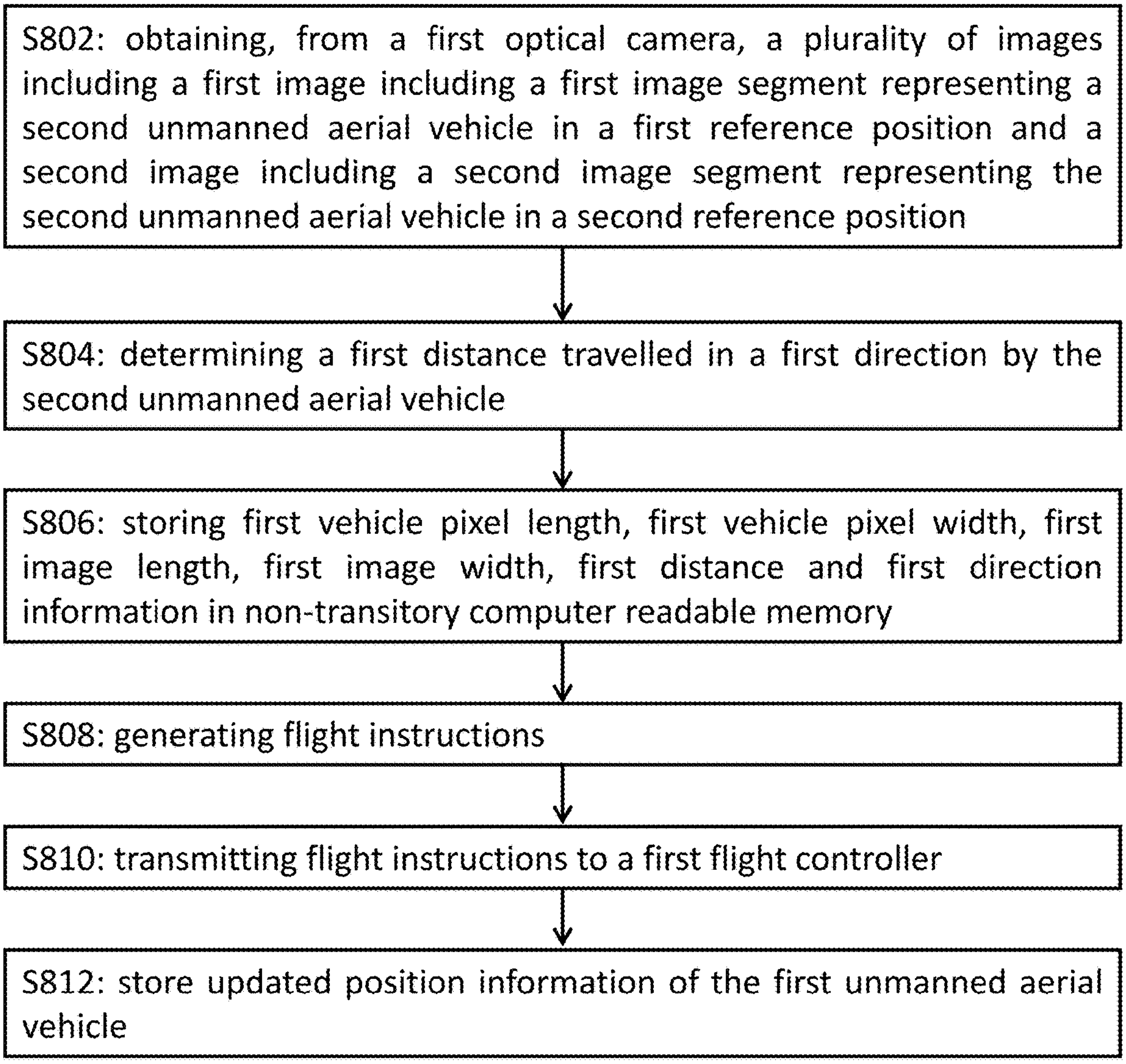
FIG. 8 illustrates an exemplary flow charts of a method that may be used to direct an unmanned aerial vehicle in accordance with embodiments of the present invention.
Figure 8A:
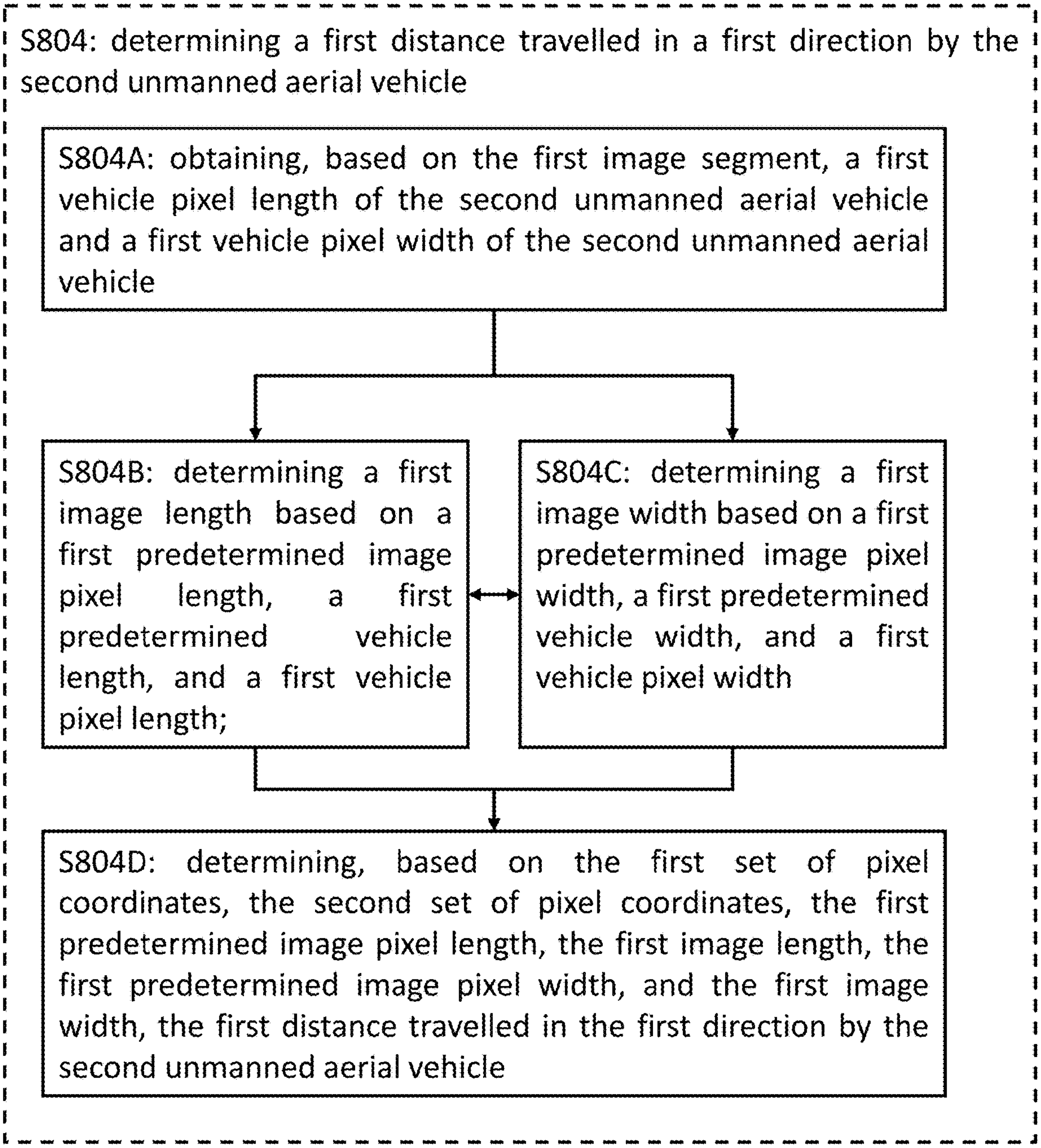
FIG. 8A illustrates an exemplary flow charts of a method that may be used to direct an unmanned aerial vehicle in accordance with embodiments of the present invention.

FIG. 8 and FIG. 8A illustrate exemplary flow charts of a method that may be used to direct an unmanned aerial vehicle (e.g., first unmanned aerial vehicle 112-1), including to a target absolute position, in accordance with embodiments of the present invention. In embodiments, the first unmanned aerial vehicle may include a first optical camera mounted on the first unmanned aerial vehicle (e.g., an optical camera of camera payload 708-1) having a first field of view (e.g., camera field of view 302), a first flight controller (e.g., flight controller 110-1), a processor operably connected to the first optical camera and the first flight controller (e.g., processor 106-1), and non-transitory computer readable memory (e.g., memory 107-1). In embodiments, the first unmanned aerial vehicle may also include an IMU 104-1 and/or other sensors in accordance with embodiments of the present invention.

In embodiments, step S802 comprises obtaining, from a first optical camera, a plurality of images including a first image including a first image segment representing a second unmanned aerial vehicle (e.g., UAV 112-2) in a first reference position and a second image including a second image segment representing the second unmanned aerial vehicle in a second reference position. In embodiments, the first reference position is defined by a first set of pixel coordinates. In embodiments, the second reference position is defined by a second set of pixel coordinates. In embodiments, each image of the plurality of images has a first predetermined image pixel length in a first coordinate direction and a first predetermined image pixel width in a second coordinate direction orthogonal to the first coordinate direction. In embodiments, one or more of the plurality of images may be associated with a time and/or timestamp.

In embodiments, the first unmanned aerial vehicle and the second unmanned aerial vehicles form a set of unmanned aerial vehicles. For example, the first unmanned aerial vehicle and the second unmanned aerial vehicles may be configured to be controlled together or by the same entity. In embodiments, the first unmanned aerial vehicle and the second unmanned aerial vehicles do not form a set of unmanned aerial vehicles. For example, the first unmanned aerial vehicle and the second unmanned aerial vehicle may not be configured so as to be controlled together or may be controlled by different entities.

In embodiments, the first image is taken at a first time while the first unmanned aerial vehicle is at a first position (e.g., P3 of FIG. 4, to give an example). In embodiments, the second image is taken at a second time. In embodiments, the first unmanned aerial vehicle is at the first position (e.g., P3 of FIG. 4, to give an example) at the second time. In embodiments, the first unmanned aerial vehicle is at a third position at the second time. In embodiments, the first and second reference positions are defined by one or more of respective distances from the center of the photos, as well as radial and azimuthal angles. In embodiments, at the first time, the first unmanned aerial vehicle is at a first altitude. In embodiments, at the first time, the second unmanned aerial vehicle is at a second altitude. In embodiments, at the second time, the first unmanned aerial vehicle is at a third altitude. In embodiments, at the second time, the second unmanned aerial vehicle is at a fourth altitude. In embodiments, the first altitude may be the same, as or different than, the second altitude. In embodiments, the second altitude may be the same as, or different than, the fourth altitude.

In embodiments, the second unmanned aerial vehicle comprises predetermined vehicle dimensions including a first predetermined vehicle length and a first predetermined vehicle width in accordance with embodiments of the present invention. In embodiments, the predetermined vehicle dimensions are obtained from mission parameters stored in the non-transitory computer readable memory. In embodiments, the non-transitory computer readable memory further includes processor executable code that when executed by the processor performs the steps of identifying, using machine vision, the second unmanned aerial vehicle and retrieving from the non-transitory computer readable memory the predetermined vehicle dimensions, wherein the predetermined vehicle dimensions corresponding to the second unmanned aerial vehicle.

In embodiments, at least one of the plurality of images is a still frame of a video. In embodiments, at least one of the plurality of images is a digital photograph.

In embodiments, the first predetermined image pixel length, the first predetermined image pixel width, and the first field of view is based on the output of the first optical camera. For example, the first optical camera may produce images with a pixel width of 2592 pixels and a first image pixel length of 1944 pixels, as in the case of a raspberry pi noir camera. Continuing the example, the plurality of images may be taken with a field of view defined by an angle of 130 degrees.

In embodiments, the plurality of images may undergo preprocessing so as to emulate a rectangular field of view. For example, one or more of the plurality of images may be cropped to have a certain aspect ratio or to have a certain pixel length and width. As another example, the output of a "fisheye" optical camera may be mapped to cartesian pixel coordinates based on the radial distance r from the center of the camera and the position of the pixels. Continuing the example, the image from a curved lens may be mapped by calculating the radial distance r from the center of a fisheye image for each pixel using equation (2):

$$r = \sqrt{(x - x_c)^2 + (y - y_c)^2} \tag{2}$$

where $(x_c, y_c)$ is the center of the image and (x,y) are the coordinates of each pixel. Next, the radial distance for each pixel is converted to an angle θ by equation (3):

$$\theta = \arctan\left(\frac{r}{f}\right) \tag{3}$$

where f is the effective focal length of the fisheye lens. Finally, the pixels may be mapped to a new position using the pinhole camera model using equations (4) and (5):

$$x' = \theta \cdot \cos(\phi) \tag{4}$$

$$y' = \theta \cdot \sin(\phi) \tag{5}$$

where ϕ is the azimuthal angle in the fisheye image and (x' and y') are the new coordinates in the rectilinear image.

In embodiments, the first unmanned aerial vehicle includes a second optical camera mounted on the first unmanned aerial vehicle. In embodiments, at least one of the plurality of images is based upon an output of the second optical camera. For example, one of the plurality of images may be directly from the second optical camera. As another example, one of the plurality of images may be a composite of an image obtained from the first optical camera and the second optical camera.

Figure 3B:
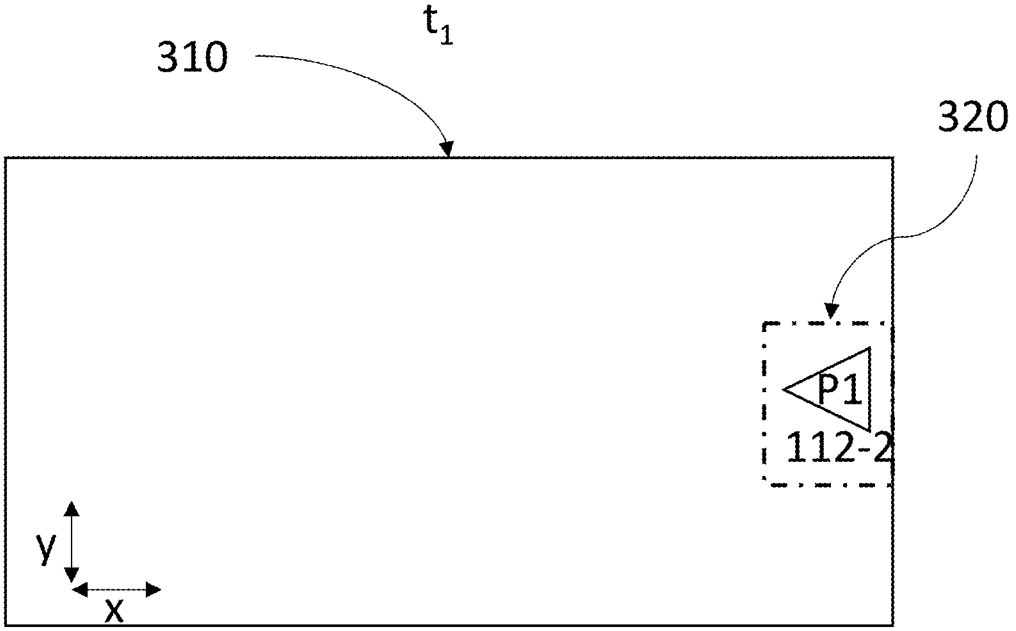
FIG. 3B is an exemplary illustration of an image taken by an unmanned aerial vehicle of another unmanned aerial vehicle at a first time in accordance with exemplary embodiments of the present invention.
Figure 4B:
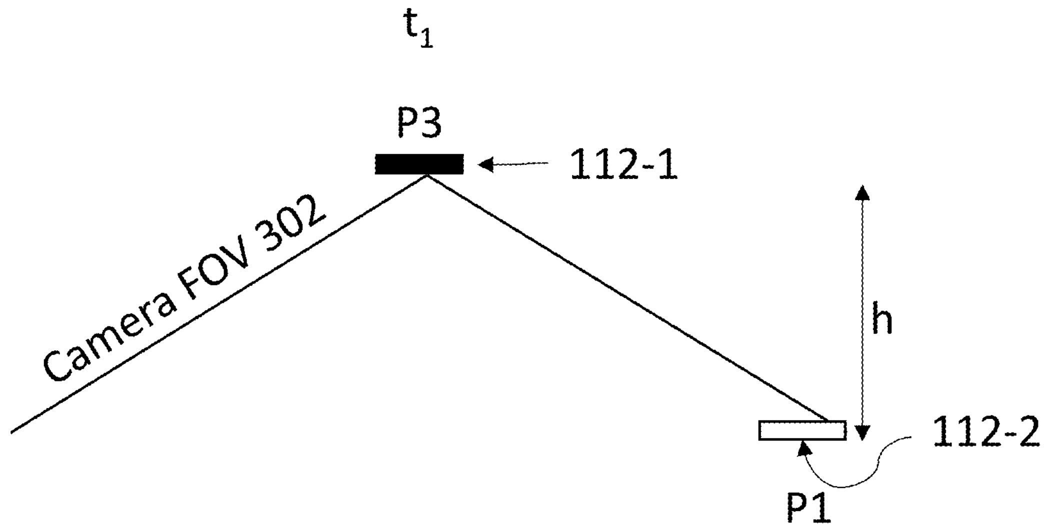
FIG. 4B illustrates a side perspective view of both unmanned aerial vehicles of FIG. 3B corresponding to their relative positions at a first time in accordance with embodiments of the present invention.
Figure 3C:
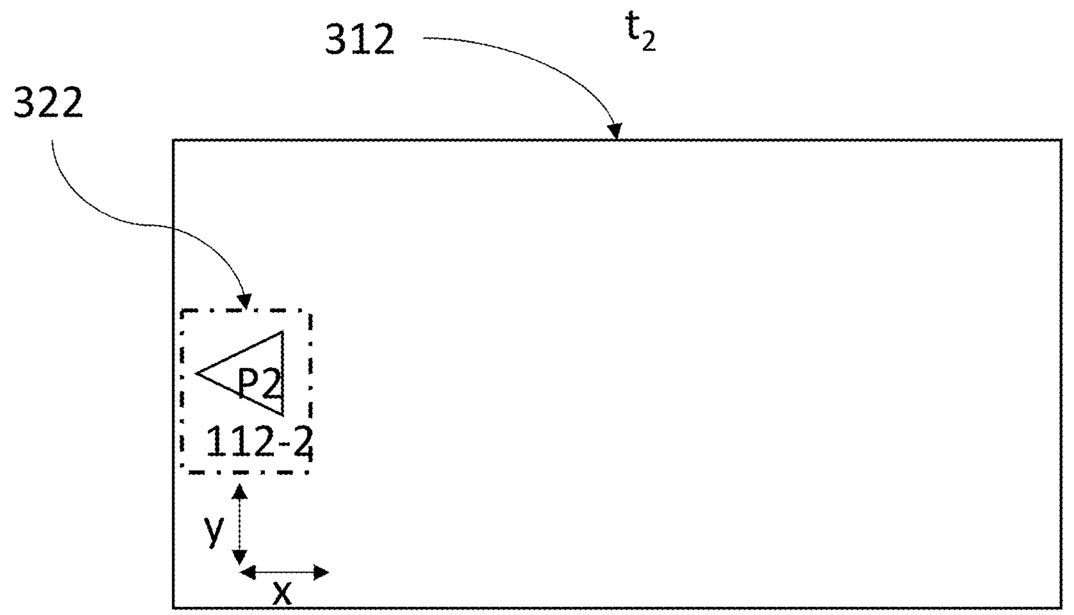
FIG. 3C is an exemplary illustration of an image taken by an unmanned aerial vehicle of another unmanned aerial vehicle at a second time in accordance with exemplary embodiments of the present invention.
Figure 4C:
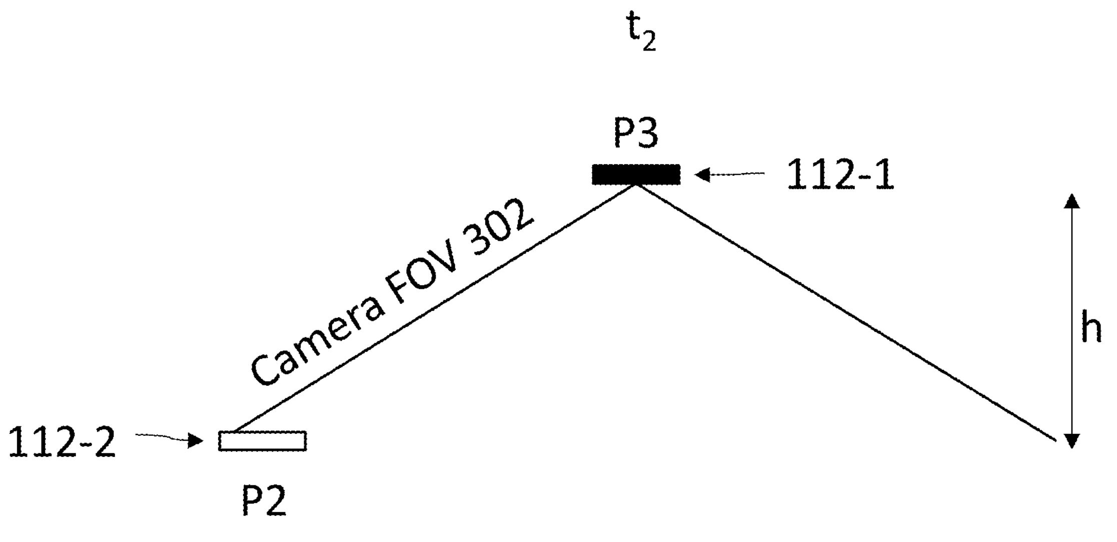
FIG. 4C illustrates a side perspective view of both unmanned aerial vehicles of FIG. 3C corresponding to their relative positions at a second time in accordance with embodiments of the present invention.

FIG. 3B is an exemplary illustration of an image taken by an unmanned aerial vehicle (e.g., first unmanned aerial vehicle 112-1) of another unmanned aerial vehicle (e.g., second unmanned aerial vehicle 112-2) at a first time (e.g., $t_1$) in accordance with exemplary embodiments of the present invention. FIG. 4B illustrates a side perspective view of both unmanned aerial vehicles of FIG. 3B corresponding to their relative positions at a first time (e.g., $t_1$) in accordance with embodiments of the present invention. FIG. 3C is an exemplary illustration of an image taken by an unmanned aerial vehicle (e.g., first unmanned aerial vehicle 112-1) of another unmanned aerial vehicle (e.g., second unmanned aerial vehicle 112-2) at a second time (e.g., $t_2$) in accordance with exemplary embodiments of the present invention. FIG. 4C illustrates a side perspective view of both unmanned aerial vehicles of FIG. 3C corresponding to their relative positions at the second time (e.g., $t_2$) in accordance with embodiments of the present invention. FIGS. 3B-C and 4B-C illustrate the views in FIGS. 3 and 4, respectively, at distinct points in time (e.g., $t_1$ and $t_2$).

In embodiments, as shown in FIG. 3B, the first image is taken at the first time and includes a first image segment of the second unmanned aerial vehicle 112-2 at a first reference position P1. In embodiments, the first reference position P1 is defined by the first set of pixel coordinates. In embodiments, the first reference position P1 is within a reference zone 320. In embodiments, first set of pixel coordinates is determined according to a first image center of mass (a first centroid) corresponding to the first image segment. In embodiments, the first centroid is based on the average position of all the weighted pixel intensities of the first image segment. In embodiments, the first centroid is calculated by dividing the sum of the product of the coordinates of each pixel of the first image segment with the respective pixel's intensity by the total intensity of each pixel of the first image segment. embodiments, the first centroid is within a first reference zone (e.g., reference zone 320). In embodiments, the first set of pixel coordinates is based on a feature of the second unmanned aerial vehicle, for example, the front, back, left side, and right side, to name a few.

In embodiments, as shown in FIG. 3C, the second image is taken at the second time and includes a second image segment of the second unmanned aerial vehicle 112-2 at a second reference position P2. In embodiments, the second reference position P2 is defined by the second set of pixel coordinates. In embodiments, second set of pixel coordinates is determined according to a second image center of mass (a second centroid) corresponding to the second image segment. In embodiments, the second centroid is based on the average position of all the weighted pixel intensities of the second image segment. In embodiments, the second centroid is calculated by dividing the sum of the product of the coordinates of each pixel of the second image segment with the respective pixel's intensity by the total intensity of each pixel of the second image segment. In embodiments, the second centroid is within a second reference zone (e.g., reference zone 322). In embodiments, the second set of pixel coordinates is based on a feature of the second unmanned aerial vehicle, for example, the front, back, left side, and right side, to name a few.

Referring back to FIG. 8, in embodiments, the process may continue with step S804. In embodiments, at step S804, the process determines a first distance travelled in a first direction by the second unmanned aerial vehicle. In embodiments, step S804 includes substeps S804A-S804D, as shown in FIG. 8A.

Referring now to FIG. 8A, the processor at substep S804A obtains, based on the first image segment, a first vehicle pixel length of the second unmanned aerial vehicle and a first vehicle pixel width of the second unmanned aerial vehicle.

In embodiments, the process may continue with substep S804B. In embodiments, at substep S804B, the processor determines a first image length based on the first predetermined image pixel length, the first predetermined vehicle length, and the first vehicle pixel length. In embodiments, the first image length is the product of the first predetermined vehicle length and the first predetermined image pixel length divided by the first vehicle pixel length. In embodiments, the process continues with substep S804C after substep S804A, for example, where the second unmanned aerial vehicle has not moved in the lengthwise direction and/or where substep S804B occurs after substep S804C, to name a couple of examples.

In embodiments, the process continues with substep S804C. In embodiments, at substep S804C, the processor determines a first image width based on the first predetermined image pixel width, the first predetermined vehicle width, and a first vehicle pixel width. In embodiments, the first image width is the product of the first predetermined vehicle width and the first predetermined image pixel width divided by the first vehicle pixel width. In embodiments, the process continues with substep S804D after substep S804B, for example, where the second unmanned aerial vehicle has not moved in the widthwise direction, or where substep S804C has already occurred, to give a couple of examples.

In embodiments, the process continues with substep S804D. In embodiments, at substep S804D, the processor determines, based on the first set of pixel coordinates, the second set of pixel coordinates, the first predetermined image pixel length, the first image length, the first predetermined image pixel width, and the first image width, the first distance travelled in the first direction by the second unmanned aerial vehicle. In embodiments, for example, where substep S804B does not take place, the first distance travelled in the first direction is not based on the first predetermined image pixel length and/or the first image length. In embodiments, for example, where substep S804C does not take place, the first distance travelled in the first direction is not based on the first predetermined image pixel width and/or the first image width.

In embodiments, the first distance travelled includes a width-wise component. In embodiments, the width-wise component is calculated according to equation (6):

$$dx = \frac{M_{uX}}{P_{uX}}(p_{x2} - p_{x1}) \tag{6}$$

where dx is the first distance travelled in the first coordinate direction, $M_{uX}$ is the first predetermined vehicle width, $P_{uX}$ is the first vehicle pixel width, $p_{x2}$ is the width-wise component of the second set of pixel coordinates and $p_{x1}$ is the width-wise component of the first set of pixel coordinates.

In embodiments, the first distance travelled includes a lengthwise component. In embodiments, the lengthwise component is calculated according to equation (7):

$$dy = \frac{M_{uY}}{P_{uY}}(p_{y2} - p_{y1}) \tag{7}$$

where dy is the second distance travelled in the second coordinate direction, $M_{uY}$ is the first predetermined vehicle length, $P_{uY}$ is the first vehicle pixel length, $p_{y2}$ is the lengthwise component of the second set of pixel coordinates and $p_{y1}$ is the lengthwise component of the first set of pixel coordinates.

In embodiments, the first distance travelled in the first direction is based on one or more of the first altitude, the second altitude, the third altitude, the fourth altitude, the first time, the second time, communications received from the second unmanned vehicle, and ultrawideband ranging techniques, to give a few examples.

In embodiments, the first distance travelled in the first direction is based on a first height differential between first unmanned aerial vehicle and the second unmanned aerial vehicle. In embodiments, the first distance travelled in the first direction is further based on a second height differential between the first unmanned aerial vehicle and the second unmanned aerial vehicle. In embodiments, the processor may determine the first height differential and the second height differential by the steps of: obtaining, from the second image, a second vehicle pixel length of the second unmanned aerial vehicle and a second vehicle pixel width of the second unmanned aerial vehicle, determining a second image length based on the first predetermined image pixel length, the first predetermined vehicle length, and the second vehicle pixel length, determining the first height differential between the first unmanned aerial vehicle based on the field of view and the first image length, and determining the second height differential between the first unmanned aerial vehicle based on the field of view and the second image length. In embodiments, the first height differential may be calculated according to equation (8):

$$Z_1 = \frac{Y_{f1}}{2\tan\left(\frac{\theta_{FOV}}{2}\right)} \tag{8}$$

where $Z_1$ is the first height differential, $Y_{f1}$ is the first image length, and $\theta_{FOV}$ is the field of view.

In embodiments, the second height differential may be calculated according to equation (9):

$$Z_2 = \frac{Y_{f2}}{2\tan\left(\frac{\theta_{FOV}}{2}\right)} \tag{9}$$

where $Z_2$ is the first height differential, $Y_{f2}$ is the first image length, and $\theta_{FOV}$ is the field of view.

In embodiments, the first height differential and the second height differential are based on measurements such as the range between the first unmanned aerial vehicle and the second unmanned aerial vehicle, the first altitude, the second altitude, the third altitude, the fourth altitude, measurements (such as acceleration, velocity, direction, magnetic orientation) from sensors such as an internal measurement unit (e.g., IMU 104-1), to name a few examples.

In embodiments, several techniques may be combined to determine the first distance travelled in the first direction. For example, the first distance and the first direction may also be based on the range between the first unmanned aerial vehicle and the second unmanned aerial vehicle, and the acceleration, velocity, direction, magnetic orientation as measured by the first unmanned aerial vehicle and/or second unmanned aerial vehicle. In embodiments, the first distance travelled may be based on weather conditions, for example, wind speed and air pressure, to give a couple of examples.

In embodiments, the first unmanned aerial vehicle has a first velocity at the first time. In embodiments, the first unmanned aerial vehicle has an average acceleration between the first time and the second time. In embodiments, the first distance travelled is based on the first velocity. In embodiments, the first distance travelled is based on the average acceleration. In embodiments, the first distance travelled is based on the first velocity and the average acceleration. In embodiments, the width-wise component of the first distance travelled is calculated according to equation (10):

$$dx = \frac{M_{uX}}{P_{uX}}(p_{x2} - p_{x1}) + v_x t + \frac{1}{2}a_x t^2 \tag{10}$$

where dx is the first distance travelled in the first coordinate direction, $M_{uX}$ is the first predetermined vehicle width, $P_{uX}$ is the first vehicle pixel width, $p_{x2}$ is the width-wise component of the second set of pixel coordinates, $p_{x1}$ is the width-wise component of the first set of pixel coordinates, t is the difference between the second time and the first time, $v_x(t)$ is the width-wise component of the first velocity, and $a_x$ is the width-wise component of an average acceleration of the first unmanned aerial vehicle. In embodiments, the lengthwise component is calculated according to equation (11):

$$dy = \frac{M_{uY}}{P_{uY}}(p_{y2} - p_{y1}) + v_y t + \frac{1}{2}a_y t^2 \tag{11}$$

wherein dy is the second distance travelled in the second coordinate direction, $M_{uY}$ is the first predetermined vehicle length, $P_{uY}$ is the first vehicle pixel length, $p_{y2}$ is the lengthwise component of the second set of pixel coordinates, $p_{y1}$ is the lengthwise component of the first set of pixel coordinates on, t is the difference between the second time and the first time, $v_y(t)$ is the lengthwise component of the first velocity, and $a_y$ is the lengthwise component of an average acceleration of the first unmanned aerial vehicle. In embodiments, the first velocity includes a respective third component corresponding to the speed and direction of the aerial vehicle in a direction orthogonal to the widthwise component and lengthwise component. In embodiments, the average acceleration includes a respective third component corresponding to the speed and direction of the aerial vehicle in a direction orthogonal to the widthwise component and lengthwise component.

Referring back to FIG. 8, in embodiments, the process continues with step S806. At step S806, the processor stores information relating to the first vehicle pixel length, the first vehicle pixel width, the first image length, the first image width, the first distance and the first direction in non-transitory computer readable memory. In embodiments, the processor does not store some, or all, of this information. In embodiments, the processor does not perform step S806.

In embodiments, the process continues with steps S808 and steps S810. At step S808, the processor generates flight instructions. In embodiments, at step S810, the processor transmits the flight instructions to the first flight controller. In embodiments, the flight instructions are generated based on the first distance travelled, the first direction, and/or one or more preprogrammed flight instructions (e.g., one or more flight paths, one or more target absolute positions, one or more mission parameters, one or more altitude guidelines, one or more mission velocities, one or more mission accelerations, and power usage, to name a few examples). In embodiments, the flight instructions are further based on the first velocity of the first unmanned aerial vehicle. In embodiments, the flight instructions are generated based on a measured wind speed. In embodiments, the flight instructions are based on images from the first optical camera and whether an image segment featuring the third unmanned aerial vehicle is within reference frame 320 (see, e.g., FIG. 3D). In embodiments, the processor is configured to obtain the preprogrammed flight instructions from the non-transitory computer readable memory. In embodiments, the first unmanned aerial vehicle is configured to obtain the preprogrammed flight instructions wirelessly (e.g., before or during a flight) and or via direct upload without the use of wireless technology (e.g., before a flight).

In embodiments, the first flight controller is configured to generate a plurality of flight control signals in order to direct the first unmanned aerial vehicle to a second position at a fifth altitude based on the flight instructions. In embodiments, the first flight controller generates a plurality of flight control signals in order to direct the first unmanned aerial vehicle to a target position at a fifth altitude based on the flight instructions. In embodiments, the fifth altitude may be the same as, or different than, the third altitude and/or fourth altitude. In embodiments, the target position is along a flight path. In embodiments, the first unmanned aerial vehicle is directed to the target position based on commands provided (e.g., to one or more motors, such as motors 416 depicted in FIG. 1) based on the flight instructions. In embodiments, the position of the unmanned aerial vehicle may be transmitted to a first user of a first remote control system. In embodiments, the first user may provide commands.

Figure 3D:
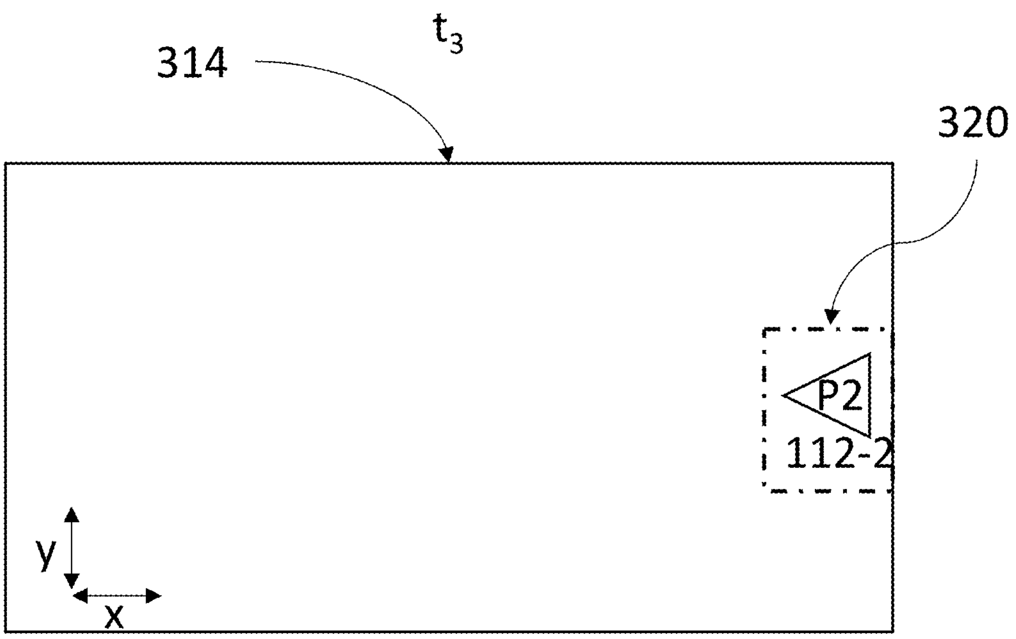
FIG. 3D illustrates an exemplary illustration of an image taken with the first unmanned aerial vehicle at a target position in accordance with exemplary embodiments of the present invention.
Figure 4D:
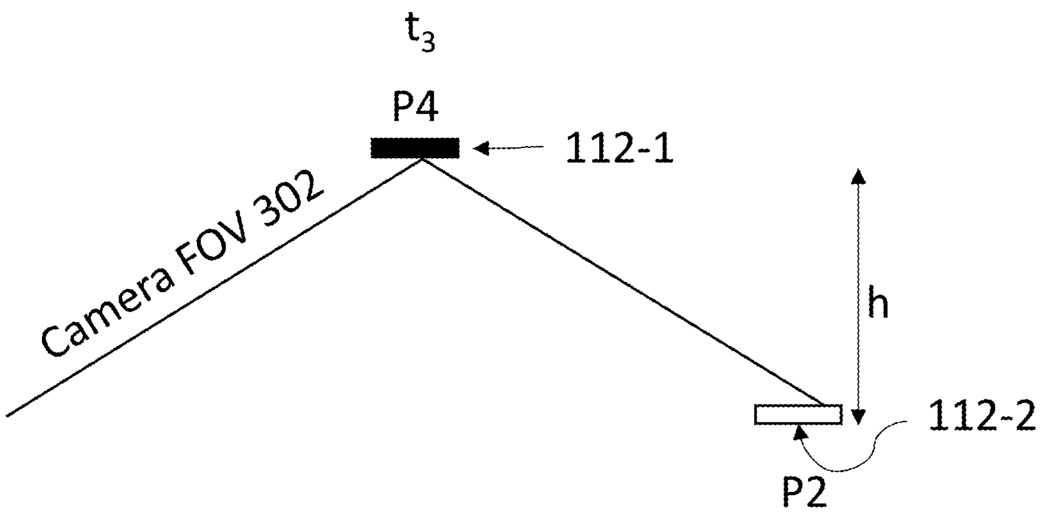
FIG. 4D illustrates a side perspective view of unmanned aerial vehicles corresponding to their relative positions when the image of FIG. 3D is taken in accordance with exemplary embodiments of the present image.

FIGS. 3C, 3D, 4C, and 4D illustrate the movement of the first unmanned vehicle (e.g., UAV 112-2) from an initial position (e.g., P3 in FIG. 4C) to a target position (e.g. P4 in FIG. 4D) in accordance with exemplary embodiments of the present invention. FIG. 3D illustrates an exemplary illustration of an image taken (e.g., image 314, taken at time $t_3$) with an unmanned aerial vehicle (e.g., first unmanned aerial vehicle 112-1) at a target position (e.g., position P4). in accordance with exemplary embodiments of the present invention. FIG. 4D illustrates a side perspective view of unmanned aerial vehicles (e.g., the first unmanned aerial vehicle 112-1 and the second unmanned aerial vehicle 112-2) corresponding to their relative positions when the image of FIG. 3D is taken in accordance with exemplary embodiments of the present image.

In embodiments, the process may continue with step S812. In embodiments, as step S812, the processor stores updated position information of the first unmanned aerial vehicle associated with the target position. For example, the processor may store an approximation of the GPS location at the target position. In embodiments, the target position is stored as an approximated GPS location determined according to equations (12) and (13):

$$lat_2 = lat_1 + \frac{dy}{R}\left(\frac{180}{\pi}\right) \tag{12}$$

$$long_2 = long_1 + \frac{dx}{R\cos\left(\frac{\pi lat_1}{180}\right)}\left(\frac{180}{\pi}\right) \tag{13}$$

where $lat_2$ is the latitude of the target position (e.g., P4 of FIG. 4D), $long_2$ is the longitude of the target position, $lat_1$ is the latitude of an initial position (e.g., P3 of FIG. 4C), $long_1$ is the longitude of the initial position, R is an approximation of the earth's radius (e.g., 6,371 km, to give an example), dx is the first distance travelled in the first coordinate direction where the first coordinate direction is compass north, and dy is the second distance travelled in the second coordinate direction. In embodiments, the initial position is the position of the unmanned aerial vehicle at the first time.

In embodiments, the approximated GPS location may be used to compare whether the first unmanned aerial vehicle is proceeding along the correct flight path and/or has reached a target absolute position. In embodiments, the approximated GPS location may be based on an initial position at the first time and an updated position at a third time of the first unmanned aerial vehicle.

In embodiments, the updated position information may include information associated with the position of the second unmanned aerial vehicle. In embodiments, a current position of the first unmanned aerial vehicle is stored as updated position information. In embodiments, the current position of the first unmanned aerial vehicle may be based on one or more of the plurality of images, the velocity of the first unmanned aerial vehicle and/or the second unmanned aerial vehicle, the acceleration of the first unmanned aerial vehicle and/or the second unmanned aerial vehicle, the altitude of the first unmanned aerial vehicle and/or the second unmanned aerial vehicle, and/or the distance between the first unmanned aerial vehicle and/or the second unmanned aerial vehicle.

In embodiments, this process may be repeated an arbitrary number of times. For example, the process may be repeated along a flight path until a target destination, for example as stored in memory associated with the computer/processor 106-1 or flight controller 110-1, is reached by the first unmanned aerial vehicle and/or the second unmanned aerial vehicle. In embodiments, the process may repeat with the use of a third image (e.g., image 314 of FIG. 3C). In embodiments, the repeated process may be similar to the process described with respects to S802-S812 of FIG. 8.

In embodiments, in accordance with embodiments of the present invention, the first unmanned aerial vehicle maintains a first flight path at the first altitude based on the one or more preprogrammed instructions. In embodiments, the second unmanned aerial vehicle maintains a second flight path at the second altitude based on one or more preprogrammed instructions.

In embodiments, in accordance with embodiments of the present invention, at the commencement of step S802, the first unmanned aerial vehicle is stationary at the first altitude and the second unmanned aerial vehicle is stationary at the second altitude.

In embodiments, in accordance with embodiments of the present invention, at the commencement of step S802, the first unmanned aerial vehicle is stationary at the first altitude and the second unmanned aerial vehicle is moving along the second flight path at a first velocity at the second altitude.

In embodiments, in accordance with embodiments of the present invention, the first unmanned aerial vehicle maintains a first flight path at the first altitude based on the one or more preprogrammed instructions. In embodiments, the second unmanned aerial vehicle maintains a second flight path at the second altitude based on one or more preprogrammed instructions.

In embodiments, in accordance with embodiments of the present invention, at the commencement of step S802, the first unmanned aerial vehicle is moving along the first flight path at the first velocity at the first altitude and the second unmanned aerial vehicle is stationary at the second altitude.

In embodiments, in accordance with embodiments of the present invention, at the commencement of step S802, the first unmanned aerial vehicle is moving along the first flight path at the first velocity at the first altitude and the second unmanned aerial vehicle is moving along the second flight path at a second velocity at the second altitude.

Figure 9:
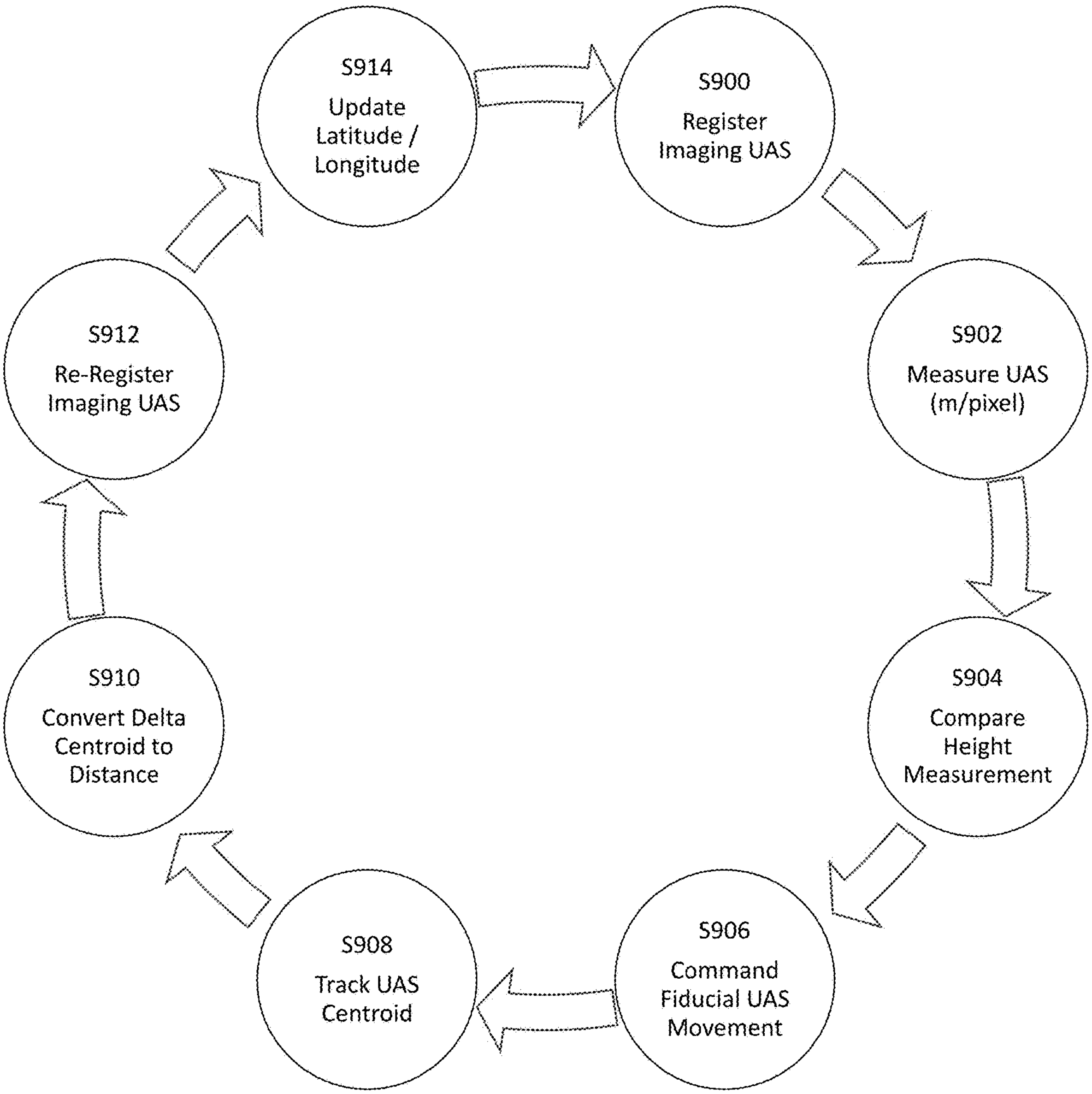
FIG. 9 is a graph depicting a process flow in accordance with embodiments of the present invention.

FIG. 9 is a graph depicting a process flow in accordance with embodiments of the present invention. In embodiments, the process begins at step S900. At step S900, an imaging unmanned aircraft system ("UAS") (e.g., UAV 112-1) is registered. For example, the imaging UAS may move and/or orient itself such that an image segment of a fiducial UAS (e.g., UAV 112-2) is within a reference frame (e.g., reference frame 320 of image 310 in FIG. 3B). In embodiments, at step S902, the fiducial UAS may be measured in accordance with embodiments of the present invention (e.g., a distance per pixel may be determined). In embodiments, at step S904, a height measurement is compared between the imaging and fiducial UAS in accordance with embodiments of the present invention. For example, the imaging UAS altitude may be determined by comparing an altitude derived from barometric pressure with an altitude based on one or more of a plurality of images. In embodiments, at step S906, the fiducial UAS moves, for example, after being commanded to by the imaging UAS. In embodiments, at step S908, the fiducial UAS is tracked by the imaging UAS in accordance with embodiments of the present invention (for example, using a plurality of images and centroids). In embodiments, at step S910, the change in pixel position of the fiducial UAS (e.g., the distance between centroids, to give an example) is converted to a distance in accordance with embodiments of the present invention. In embodiments, at S912 and S914, the imaging UAS is re-registered and an approximated GPS location is updated. In embodiments, the approximated GPS location is compared to a flight path or target absolute location to determine flight instructions. In embodiments, this process may be repeated an arbitrary number of times. For example, the process may be repeated along a flight path until a target destination, for example as stored in memory associated with the computer/processor 106-1 or flight controller 110-1, is reached by the imaging UAS or other UASs.

In embodiments, FIG. 9 is implemented using a process including the steps of: obtaining, from a first optical camera of a first unmanned arial vehicle, a plurality of images, each image of the plurality of images having a first predetermined image pixel length in a first coordinate direction and a first predetermined image pixel width in a second coordinate direction orthogonal to the first coordinate direction, wherein the plurality of images includes a first image and a second image, wherein the first image is taken at a first time while the first unmanned aerial vehicle is at a first position, and includes a first image segment representing a second unmanned aerial vehicle in a first reference position defined by a first set of pixel coordinates, wherein at the first time, the first unmanned aerial vehicle is at a first altitude and the second unmanned aerial vehicle is at a second altitude, wherein the second image is taken at a second time, and includes a second image segment representing the second unmanned aerial vehicle in a second reference position defined by a second set of pixel coordinates, wherein at the second time, the first unmanned aerial vehicle is at a third altitude and the second unmanned aerial vehicle is at a fourth altitude, and wherein the second unmanned aerial vehicle comprises predetermined vehicle dimensions including a first predetermined vehicle length and a first predetermined vehicle width; determining a first distance travelled in a first direction by the second unmanned aerial vehicle by the steps of: obtaining, based on the first image segment, a first vehicle pixel length of the second unmanned aerial vehicle and a first vehicle pixel width of the second unmanned aerial vehicle; determining a first image length based on the first predetermined image pixel length, the first predetermined vehicle length, and the first vehicle pixel length; determining a first image width based on the first predetermined image pixel width, the first predetermined vehicle width, and the first vehicle pixel width; determining, based on the first set of pixel coordinates, the second set of pixel coordinates, the first predetermined image pixel length, the first image length, the first predetermined image pixel width, and the first image width, the first distance travelled in the first direction by the second unmanned aerial vehicle; storing in the non-transitory computer readable memory the first vehicle pixel length, the first vehicle pixel width, the first image length, the first image width, the first distance and the first direction; generating flight instructions based on the first distance travelled, the first direction, and one or more preprogrammed flight instructions; transmitting to the first flight controller, the flight instructions, wherein the first flight controller generates a plurality of flight control signals in order to direct the first unmanned aerial vehicle to a target position at a fifth altitude based on the flight instructions; and wherein the first unmanned aerial vehicle is directed to the target position based on commands provided based on the flight instructions; and store updated position information of the first unmanned aerial vehicle associated with the target position. In embodiments, the process may include determining a first height differential and a second height differential by: obtaining, from the second image, a second vehicle pixel length of the second unmanned aerial vehicle and a second vehicle pixel width of the second unmanned aerial vehicle; determining a second image length based on the first predetermined image pixel length, the first predetermined vehicle length, and the second vehicle pixel length; determining the first height differential between the first unmanned aerial vehicle based on the field of view and the first image length; and determining the second height differential between the first unmanned aerial vehicle based on the field of view and the second image length. The first distance travelled In embodiments, non-transitory computer readable memory (e.g., memory 107-1) stores information measured and calculated by the first unmanned aerial vehicle and/or the imaging UAS (e.g., UAV 112-1). In embodiments, the non-transitory computer readable memory may be wholly or partially remote from the body of the UAV 112-1.

In exemplary embodiments, a first unmanned aerial vehicle comprises: a) a first optical camera mounted on the first unmanned aerial vehicle and having a first field of view; b) a first flight controller; c) a processor operably connected to the first optical camera and the first flight controller; d) non-transitory computer readable memory operably connected to the processor and including processor executable code that when executed by the processor performs the steps of: (i) obtaining, from the first optical camera, a plurality of images, each image of the plurality of images having a first predetermined image pixel length in a first coordinate direction and a first predetermined image pixel width in a second coordinate direction orthogonal to the first coordinate direction, wherein the plurality of images includes a first image and a second image, wherein the first image is taken at a first time while the first unmanned aerial vehicle is at a first position, and includes a first image segment representing a second unmanned aerial vehicle in a first reference position defined by a first set of pixel coordinates, wherein at the first time, the first unmanned aerial vehicle is at a first altitude and the second unmanned aerial vehicle is at a second altitude, wherein the second image is taken at a second time, and includes a second image segment representing the second unmanned aerial vehicle in a second reference position defined by a second set of pixel coordinates, wherein at the second time, the first unmanned aerial vehicle is at a third altitude and the second unmanned aerial vehicle is at a fourth altitude, and wherein the second unmanned aerial vehicle comprises predetermined vehicle dimensions including a first predetermined vehicle length and a first predetermined vehicle width; (ii) determining a first distance travelled in a first direction by the second unmanned aerial vehicle by the steps of: (a) obtaining, based on the first image segment, a first vehicle pixel length of the second unmanned aerial vehicle and a first vehicle pixel width of the second unmanned aerial vehicle; (b) determining a first image length based on the first predetermined image pixel length, the first predetermined vehicle length, and the first vehicle pixel length; (c) determining a first image width based on the first predetermined image pixel width, the first predetermined vehicle width, and the first vehicle pixel width; (d)

determining, based on the first set of pixel coordinates, the second set of pixel coordinates, the first predetermined image pixel length, the first image length, the first predetermined image pixel width, and the first image width, the first distance travelled in the first direction by the second unmanned aerial vehicle; (iii) storing in the non-transitory computer readable memory the first vehicle pixel length, the first vehicle pixel width, the first image length, the first image width, the first distance and the first direction; (iv) generating flight instructions based on the first distance travelled, the first direction, and one or more preprogrammed flight instructions; (v) transmitting to the first flight controller, the flight instructions, wherein the first flight controller generates a plurality of flight control signals in order to direct the first unmanned aerial vehicle to a target position at a fifth altitude based on the flight instructions; and wherein the first unmanned aerial vehicle is directed to the target position based on commands provided based on the flight instructions; and (vi) store updated position information of the first unmanned aerial vehicle associated with the target position.

In embodiments, the first image length is the product of the first predetermined vehicle length and the first predetermined image pixel length divided by the first vehicle pixel length.

In embodiments, the first image width is the product of the first predetermined vehicle width and the first predetermined image pixel width divided by the first vehicle pixel width.

In embodiments, the first distance travelled comprises a width-wise component and a lengthwise component, wherein the width-wise component is calculated according to equation (6):

$$dx = \frac{M_{uX}}{P_{uX}}(p_{x2} - p_{x1}) \tag{6}$$

wherein dx is the width-wise component of the first distance travelled in the first coordinate direction, $M_{uX}$ is the first predetermined vehicle width, $P_{uX}$ is the first vehicle pixel width, $p_{x2}$ is the width-wise component of the second set of pixel coordinates and $p_{x1}$ is the width-wise component of the first set of pixel coordinates, and wherein the lengthwise component is calculated according to equation (7):

$$dy = \frac{M_{uY}}{P_{uY}}(p_{y2} - p_{y1}) \tag{7}$$

wherein dy is the lengthwise component of the first distance travelled in the second coordinate direction, $M_{uY}$ is the first predetermined vehicle length, $P_{uY}$ is the first vehicle pixel length, $p_{y2}$ is the lengthwise component of the second set of pixel coordinates and $p_{y1}$ is the lengthwise component o of the first set of pixel coordinates.

In embodiments, the target position is stored as an approximate GPS location determined according to equations (12) and (13):

$$lat_2 = lat_1 + \frac{dy}{R}\left(\frac{180}{\pi}\right) \tag{12}$$

$$long_2 = long_1 + \frac{dx}{R\cos\left(\frac{\pi lat_1}{180}\right)}\left(\frac{180}{\pi}\right) \tag{13}$$

wherein $lat_2$ is the latitude of the target position, $long_2$ is the longitude of the target position, $lat_1$ is the latitude of an initial position, and $long_1$ is the longitude of the initial position, and wherein the second coordinate direction is north.

In embodiments, the first distance travelled in the first direction is further based on a first height differential and a second height differential, wherein the first height differential and second height differential are determined by the steps of: (a) obtaining, from the second image, a second vehicle pixel length of the second unmanned aerial vehicle and a second vehicle pixel width of the second unmanned aerial vehicle; (b) determining a second image length based on the first predetermined image pixel length, the first predetermined vehicle length, and the second vehicle pixel length; (c) determining the first height differential between the first unmanned aerial vehicle based on the first field of view and the first image length; and (d) determining the second height differential between the first unmanned aerial vehicle based on the first field of view and the second image length.

In embodiments, the predetermined vehicle dimensions are obtained from mission parameters stored in the non-transitory computer readable memory.

In embodiments, the non-transitory computer readable memory further includes processor executable code that when executed by the processor performs the steps of: (vii) identifying, using machine vision, the second unmanned aerial vehicle; and (viii) retrieving from the non-transitory computer readable memory the predetermined vehicle dimensions, wherein the predetermined vehicle dimensions corresponding to the second unmanned aerial vehicle.

In embodiments, the first unmanned aerial vehicle includes a second optical camera mounted on the first unmanned aerial vehicle.

The first unmanned aerial vehicle of claim 9, wherein at least one of the plurality of images is based upon an output of the second optical camera.

In embodiments, the first unmanned aerial vehicle maintains a first flight path at the first altitude based on the one or more preprogrammed flight instructions and wherein the second unmanned aerial vehicle maintains a second flight path at the second altitude based on one or more preprogrammed flight instructions.

In embodiments, at the commencement of step (i), the first unmanned aerial vehicle is stationary at the first altitude and the second unmanned aerial vehicle is stationary at the second altitude.

In embodiments, at the commencement of step (i), the first unmanned aerial vehicle is stationary at the first altitude and the second unmanned aerial vehicle is moving along the second flight path at a first velocity at the second altitude.

In embodiments, the position of the first unmanned aerial vehicle is known to a first user of a first remote control system.

In embodiments, the flight instructions are further based on a first velocity of the first unmanned aerial vehicle.

In embodiments, the one or more preprogrammed flight instructions include at least a target absolute position.

In embodiments, the one or more preprogrammed flight instructions include at least a first flight path and a first velocity.

In embodiments, the one or more preprogrammed flight instructions include at least a second flight path and a second velocity.

In embodiments, at least one of the plurality of images is a still frame of a video.

In embodiments, at least one of the plurality of images is a digital photograph.

In embodiments, the first image includes a first centroid located at the first set of pixel coordinates.

In embodiments, the first centroid is within a first reference zone.

In embodiments, the second image includes a second centroid located at the second set of pixel coordinates.

In embodiments, the second centroid is within a second reference zone.

In embodiments, the first set of pixel coordinates includes a pixel length coordinate and a pixel width coordinate.

In embodiments, the second set of pixel coordinates includes a pixel length coordinate and a pixel width coordinate.

In embodiments, the first unmanned aerial vehicle and the second unmanned aerial vehicle form a set of unmanned aerial vehicles.

In embodiments, the first altitude is the same as the third altitude.

In embodiments, the first altitude is different than the third altitude.

In embodiments, the second altitude is the same as the fourth altitude.

In embodiments, the second altitude is different than the fourth altitude.

In exemplary embodiments, a first unmanned aerial vehicle comprises: a) a first optical camera mounted on the first unmanned aerial vehicle and having a first field of view; b) a first flight controller; c) a processor operably connected to the first optical camera and the first flight controller; d) non-transitory computer readable memory operably connected to the processor and including processor executable code that when executed by the processor performs the steps of: (i) obtaining, from the first optical camera, a plurality of images, each image of the plurality of images having a first predetermined image pixel length in a first coordinate direction and a first predetermined image pixel width in a second coordinate direction orthogonal to the first coordinate direction, wherein the plurality of images includes a first image and a second image, wherein the first image is taken at a first time while the first unmanned aerial vehicle is at a first position moving at a first velocity, and includes a first image segment representing a second unmanned aerial vehicle in a first reference position defined by a first set of pixel coordinates, wherein at the first time, the first unmanned aerial vehicle is at a first altitude and the second unmanned aerial vehicle is at a second altitude, wherein the second image is taken at a second time, and includes a second image segment representing the second unmanned aerial vehicle in a second reference position defined by a second set of pixel coordinates, wherein at the second time, the first unmanned aerial vehicle is at a third altitude and the second unmanned aerial vehicle is at a fourth altitude, and wherein the second unmanned aerial vehicle comprises predetermined vehicle dimensions including a first predetermined vehicle length and a first predetermined vehicle width; (ii) determining a first distance travelled in a first direction by the second unmanned aerial vehicle by the steps of: (a) obtaining, based on the first image segment, a first vehicle pixel length of the second unmanned aerial vehicle and a first vehicle pixel width of the second unmanned aerial vehicle; (b) determining a first image length based on the first predetermined image pixel length, the first predetermined vehicle length, and the first vehicle pixel length; (c) determining a first image width based on the first predetermined image pixel width, the first predetermined vehicle width, and first vehicle pixel width; (d) determining, based on the first set of pixel coordinates, the second set of pixel coordinates, the first predetermined image pixel length, the first image length, the first predetermined image pixel width, the first image width, and the first velocity, the first distance travelled in the first direction by the second unmanned aerial vehicle; (iii) storing in the non-transitory computer readable memory the first vehicle pixel length, the first vehicle pixel width, the first image length, the first image width, the first distance and the first direction; (iv) generating flight instructions based on the first distance travelled, the first direction, and one or more preprogrammed flight instructions; (v) transmitting to the first flight controller, the flight instructions, wherein the first flight controller generates a plurality of flight control signals in order to direct the first unmanned aerial vehicle to a target position at a fifth altitude based on the flight instructions; and wherein the first unmanned aerial vehicle is directed to the target position based on commands provided based on the flight instructions; and (vi) store updated position information of the first unmanned aerial vehicle associated with the target position.

In embodiments, the first distance travelled comprises a width-wise component and a lengthwise component, wherein the width-wise component is calculated according to equation (10):

$$dx = \frac{M_{uX}}{P_{uX}}(p_{x2} - p_{x1}) + v_x t + \frac{1}{2}a_x t^2 \tag{10}$$

wherein dx is the width-wise component of the first distance travelled in the first coordinate direction, $M_{uX}$ is the first predetermined vehicle width, $P_{uX}$ is the first vehicle pixel width, $p_{x2}$ is the width-wise component of the second set of pixel coordinates, $p_{x1}$ is the width-wise component of the first set of pixel coordinates, t is the difference between the second time and the first time, $v_x(t)$ is the width-wise component of the first velocity, and $a_x$ is the width-wise component of an average acceleration of the first unmanned aerial vehicle; and wherein the lengthwise component is calculated according to equation (11):

$$dy = \frac{M_{uY}}{P_{uY}}(p_{y2} - p_{y1}) + v_y t + \frac{1}{2}a_y t^2 \tag{11}$$

wherein dy is the lengthwise component of the first distance travelled in the second coordinate direction, $M_{uY}$ is the first predetermined vehicle length, $P_{uY}$ is the first vehicle pixel length, $p_{y2}$ is the lengthwise component of the second set of pixel coordinates, $p_{y1}$ is the lengthwise component of the first set of pixel coordinates on, t is the difference between the second time and the first time, $v_y(t)$ is the lengthwise component of the first velocity, and $a_y$ is the lengthwise component of an average acceleration of the first unmanned aerial vehicle.

In embodiments, the first unmanned aerial vehicle maintains a first flight path at the first altitude based on the one or more preprogrammed flight instructions and wherein the second unmanned aerial vehicle maintains a second flight path at the second altitude based on one or more preprogrammed flight instructions.

In embodiments, the commencement of step (i), the first unmanned aerial vehicle is moving along the first flight path at the first velocity at the first altitude and the second unmanned aerial vehicle is stationary at the second altitude.

In embodiments, at the commencement of step (i), the first unmanned aerial vehicle is moving along the first flight path at the first velocity at the first altitude and the second unmanned aerial vehicle is moving along the second flight path at a second velocity at the second altitude.

In embodiments, the flight instructions are further based on a measured wind speed.

The following is an example of how pixel image data and internal measurements are stored and used to determine a position of an unmanned aerial vehicle in accordance with embodiments of the present invention.

EXAMPLE

Tables 1-4 below provide a nonlimiting example of a form of information in accordance with embodiments of the invention, where such information is stored in the computer readable memory and based on simulated computer data which represents the movement of an unmanned aerial vehicle within the camera field of view of an optical camera of the first unmanned aerial vehicle with a camera having a field of view of 130 degrees, a first predetermined pixel length (x) of 2592 pixels, a second predetermined pixel width (y) of 1944 pixels, a first image length of 42.89 meters, and a second image length of 42.89 meters. In embodiments, other data and other comparable forms may be used.

Table 1 depicts the simulated location of a centroid at a given pixel coordinate (px, py) in a plurality of images in accordance with embodiments of the present invention:

TABLE 1

| Camera Pixel Position (Computer Simulation) Camera Information | |
|---|---|
| Px | Py |
| 0 | 0 |
| 0 | 0 |
| 2 | 0 |
| 4 | 0 |
| 9 | 0 |
| 14 | 0 |
| 23 | 0 |
| 34 | 0 |
| 49 | 0 |
| 64 | 0 |
| 81 | 1 |
| 100 | 1 |
| 120 | 1 |
| 141 | 1 |
| 163 | 1 |
| 188 | 1 |

TABLE 1-continued

| Camera Pixel Position (Computer Simulation) Camera Information | |
|---|---|
| Px | Py |
| 213 | 0 |
| 240 | 0 |
| 269 | 0 |
| 300 | 1 |
| 332 | 1 |
| 366 | 2 |
| 402 | 3 |
| 438 | 4 |
| 475 | 7 |
| 514 | 10 |
| 555 | 14 |
| 599 | 18 |
| 643 | 20 |
| 690 | 24 |
| 739 | 27 |
| 791 | 29 |
| 846 | 32 |
| 904 | 33 |
| 961 | 33 |
| 1022 | 34 |
| 1088 | 35 |
| 1153 | 35 |
| 1216 | 34 |
| 1282 | 35 |
| 1348 | 36 |
| 1413 | 33 |
| 1481 | 35 |
| 1555 | 35 |
| 1632 | 34 |
| 1705 | 32 |
| 1787 | 32 |
| 1868 | 35 |
| 1946 | 33 |
| 2023 | 33 |
| 2099 | 34 |
| 2183 | 39 |
| 2271 | 40 |
| 2364 | 44 |
| 2452 | 48 |
| 2537 | 57 |
| 2627 | 61 |

Table 2 depicts simulated corresponding data of the imaging UAS and/or first unmanned aerial vehicle measured at the same time as the simulated photos in accordance with embodiments of the present invention. Information measured and stored includes accelerometer data in three respective orthogonal directions (ax1, ayl, az1), barometric pressure (p1), temperature (t1), laser altitude (alt1), the range between the first unmanned aerial vehicle and the second unmanned aerial vehicle (uwb1), the altitude of the second unmanned aerial vehicle (which in embodiments may be calculated) (alt2), and the time of the measurements (t):

TABLE 2

| Data Measured on the UAS (Computer Simulation) | | | | | | | | |
|---|---|---|---|---|---|---|---|---|
| Accelerometer Data (m/s^2) | | | Barometric Pressure (milibar) | Temp (C.) | Laser Altitude (m) | Ultra-Wide Band Range (m) | UAS 2 Altitude (m) | time (ms) |
| ax1 | ay1 | az1 | p1 | t1 | alt1 | uwb1 | alt2 | t |
| 3.096 | −0.057 | −0.046 | 1009.914 | 21.964 | 26.964 | 23.608 | 17.017 | 17 |
| 2.813 | 0.089 | −0.066 | 1010.044 | 21.907 | 27.093 | 23.154 | 16.947 | 34 |
| 3.296 | 0.011 | −0.079 | 1009.971 | 21.935 | 26.996 | 23.412 | 16.921 | 51 |
| 2.644 | −0.074 | −0.072 | 1009.924 | 21.923 | 27.028 | 23.541 | 16.954 | 68 |
| 2.845 | 0.018 | −0.003 | 1010.066 | 21.956 | 27.053 | 22.971 | 16.915 | 85 |

TABLE 2-continued

| Data Measured on the UAS (Computer Simulation) | | | | | | | | | |
|---|---|---|---|---|---|---|---|---|---|
| Accelerometer Data (m/s^2) | | | Barometric Pressure (milibar) | Temp (C.) | Laser Altitude (m) | Ultra-Wide Band Range (m) | UAS 2 Altitude (m) | time (ms) |
| ax1 | ay1 | az1 | p1 | t1 | alt1 | uwb1 | alt2 | t |
| 1.359 | 0.037 | 0.033 | 1010.067 | 22.097 | 27.084 | 22.865 | 16.953 | 102 |
| 1.569 | 0.068 | −0.068 | 1010.075 | 21.930 | 26.951 | 22.722 | 16.924 | 119 |
| 1.402 | −0.057 | −0.001 | 1009.988 | 22.012 | 27.002 | 22.811 | 17.064 | 136 |
| 1.559 | 0.030 | 0.069 | 1010.067 | 22.033 | 26.920 | 22.328 | 17.006 | 153 |
| 0.014 | 0.009 | −0.070 | 1010.050 | 22.008 | 26.994 | 22.150 | 17.028 | 170 |
| 0.085 | 0.087 | 0.030 | 1009.905 | 22.059 | 26.976 | 22.507 | 16.921 | 187 |
| −0.072 | 0.073 | −0.003 | 1010.086 | 21.927 | 26.916 | 21.482 | 17.044 | 204 |
| 0.037 | −0.044 | 0.048 | 1009.954 | 22.042 | 27.050 | 21.723 | 16.981 | 221 |
| −0.084 | −0.068 | 0.012 | 1010.019 | 22.002 | 27.030 | 21.158 | 16.977 | 238 |
| −0.073 | −0.093 | −0.048 | 1010.056 | 22.078 | 27.037 | 20.688 | 16.968 | 255 |
| 0.020 | −0.090 | −0.097 | 1009.907 | 22.008 | 26.979 | 20.951 | 16.970 | 272 |
| −0.004 | 0.044 | 0.027 | 1010.042 | 21.942 | 27.023 | 20.017 | 16.967 | 289 |
| −0.005 | −0.014 | −0.083 | 1009.934 | 22.088 | 27.060 | 20.037 | 17.069 | 306 |
| 0.031 | 0.066 | −0.080 | 1010.078 | 21.993 | 26.966 | 19.090 | 16.916 | 323 |
| −0.011 | 0.073 | 0.057 | 1009.999 | 21.965 | 26.980 | 18.926 | 17.053 | 340 |
| 0.069 | −0.034 | 0.039 | 1009.983 | 22.030 | 27.000 | 18.521 | 17.100 | 357 |
| −0.018 | 0.098 | −0.009 | 1009.946 | 22.026 | 27.067 | 18.302 | 16.979 | 374 |
| 0.077 | 0.012 | −0.044 | 1009.913 | 21.926 | 27.014 | 17.999 | 16.947 | 391 |
| −0.082 | 0.070 | 0.086 | 1009.987 | 22.064 | 26.953 | 17.064 | 17.088 | 408 |
| −0.098 | 0.076 | 0.023 | 1010.077 | 22.043 | 26.945 | 16.133 | 17.086 | 425 |
| 0.041 | 0.093 | 0.054 | 1010.071 | 21.926 | 27.099 | 15.701 | 16.981 | 442 |
| 0.005 | 0.024 | 0.014 | 1009.974 | 22.015 | 26.949 | 15.639 | 17.057 | 459 |
| 0.088 | 0.037 | −0.020 | 1009.973 | 22.022 | 26.961 | 15.163 | 16.965 | 476 |
| −0.076 | −0.095 | −0.071 | 1010.015 | 22.058 | 27.009 | 14.356 | 17.030 | 493 |
| 0.091 | 0.058 | −0.056 | 1010.074 | 21.918 | 26.914 | 13.511 | 16.944 | 510 |
| 0.010 | −0.065 | −0.074 | 1010.042 | 22.056 | 27.038 | 13.060 | 17.064 | 527 |
| 0.094 | −0.046 | 0.012 | 1010.006 | 21.927 | 26.995 | 12.750 | 17.036 | 544 |
| 0.038 | 0.002 | 0.015 | 1009.931 | 22.038 | 27.096 | 12.797 | 16.956 | 561 |
| 0.081 | −0.066 | −0.015 | 1009.993 | 22.090 | 27.050 | 11.769 | 17.042 | 578 |
| −0.057 | −0.091 | −0.012 | 1009.933 | 21.952 | 26.928 | 11.730 | 17.079 | 595 |
| 0.036 | 0.024 | 0.093 | 1009.956 | 22.012 | 26.972 | 11.177 | 17.052 | 612 |
| 0.095 | 0.031 | −0.012 | 1009.998 | 22.075 | 27.012 | 10.591 | 16.947 | 629 |
| −0.025 | −0.059 | −0.042 | 1010.060 | 22.024 | 27.068 | 9.863 | 16.918 | 646 |
| −0.095 | −0.060 | 0.016 | 1009.972 | 22.029 | 27.017 | 10.388 | 16.975 | 663 |
| −0.010 | 0.085 | 0.043 | 1009.989 | 21.997 | 27.045 | 10.261 | 16.919 | 680 |
| −0.033 | −0.015 | 0.022 | 1010.022 | 21.917 | 27.027 | 9.921 | 17.074 | 697 |
| −0.064 | −0.082 | 0.015 | 1010.056 | 21.963 | 26.974 | 9.830 | 17.083 | 714 |
| 0.004 | 0.084 | 0.065 | 1010.069 | 21.904 | 26.933 | 10.084 | 17.060 | 731 |
| 0.069 | −0.024 | 0.052 | 1010.054 | 22.077 | 26.996 | 10.696 | 17.045 | 748 |
| 0.079 | −0.016 | 0.058 | 1009.977 | 21.968 | 27.007 | 11.836 | 17.088 | 765 |
| −0.098 | −0.041 | −0.087 | 1010.064 | 22.037 | 26.921 | 12.036 | 16.920 | 782 |
| 0.097 | 0.030 | 0.059 | 1010.053 | 22.004 | 26.918 | 12.829 | 17.091 | 799 |
| 0.001 | 0.095 | 0.038 | 1010.033 | 22.039 | 26.993 | 13.904 | 17.058 | 816 |
| −0.084 | −0.084 | −0.045 | 1010.063 | 21.964 | 27.097 | 14.686 | 17.062 | 833 |
| −0.064 | 0.003 | 0.056 | 1010.074 | 21.995 | 26.956 | 15.662 | 17.001 | 850 |
| −0.063 | 0.028 | 0.099 | 1010.039 | 22.021 | 27.003 | 16.888 | 16.931 | 867 |
| 0.074 | 0.086 | −0.097 | 1009.958 | 22.031 | 26.949 | 18.408 | 16.944 | 884 |
| 0.062 | −0.047 | −0.031 | 1010.015 | 22.034 | 26.911 | 19.356 | 16.978 | 901 |
| 0.058 | 0.028 | 0.042 | 1009.996 | 21.917 | 26.948 | 20.734 | 17.047 | 918 |
| −0.067 | 0.027 | −0.074 | 1009.960 | 22.043 | 26.913 | 22.138 | 17.080 | 935 |
| −0.074 | 0.062 | −0.053 | 1009.965 | 22.074 | 26.973 | 23.369 | 17.089 | 952 |
| 0.015 | −0.038 | 0.049 | 1010.099 | 22.084 | 27.037 | 24.283 | 17.060 | 969 |

Table 3 depicts simulated outcomes of calculations by the processor of the imaging UAS and/or first unmanned aerial vehicle based on the information in Tables 1 and 2 in accordance with embodiments of the present invention, such as the altitude of the imaging UAS (alt1), the velocity of the imaging UAS (v1*x*, v2*x*) and the position of the imaging UAS (p1*x*, p2*x*, z):

TABLE 3

| Calculated on the UAS (Computer Simulation) | | | | | |
|---|---|---|---|---|---|
| UAS 1 Altitude alt1 | UAS 1 X Velocity (m/s) v1x | UAS 1 Y Position (m) p1x | UAS 1 Y Velocity (m/s) v2x | UAS 1 Y Position (m) p2x | Height Delta UAS (m) z |
| 27.8050 | 0.0526 | 0.0013 | −0.0010 | 0.0000 | 10.7883 |
| 26.7180 | 0.1483 | 0.0080 | 0.0021 | 0.0001 | 9.7705 |
| 27.3285 | 0.3164 | 0.0284 | 0.0026 | 0.0002 | 10.4074 |
| 27.7250 | 0.4962 | 0.0683 | −0.0024 | −0.0001 | 10.7713 |
| 26.5375 | 0.7380 | 0.1413 | −0.0009 | −0.0001 | 9.6221 |
| 26.5300 | 0.8766 | 0.2378 | 0.0029 | 0.0004 | 9.5773 |
| 26.4597 | 1.0633 | 0.3754 | 0.0110 | 0.0022 | 9.5358 |
| 27.1874 | 1.2540 | 0.5589 | 0.0032 | 0.0021 | 10.1239 |
| 26.5318 | 1.4924 | 0.8055 | 0.0078 | 0.0036 | 9.5253 |
| 26.6715 | 1.4948 | 1.0598 | 0.0094 | 0.0054 | 9.6432 |
| 27.8857 | 1.5108 | 1.3439 | 0.0257 | 0.0117 | 10.9643 |
| 26.3695 | 1.4961 | 1.6476 | 0.0406 | 0.0215 | 9.3253 |
| 27.4763 | 1.5042 | 1.9809 | 0.0310 | 0.0273 | 10.4954 |
| 26.9340 | 1.4842 | 2.3317 | 0.0149 | 0.0289 | 9.9568 |
| 26.6227 | 1.4655 | 2.7031 | −0.0088 | 0.0237 | 9.6545 |
| 27.8643 | 1.4709 | 3.1039 | −0.0334 | 0.0112 | 10.8945 |
| 26.7366 | 1.4698 | 3.5285 | −0.0208 | 0.0070 | 9.7693 |
| 27.6399 | 1.4682 | 3.9775 | −0.0252 | −0.0014 | 10.5705 |
| 26.4421 | 1.4781 | 4.4565 | −0.0040 | 0.0008 | 9.5265 |
| 27.0940 | 1.4743 | 4.9571 | 0.0209 | 0.0121 | 10.0407 |
| 27.2314 | 1.4988 | 5.4966 | 0.0089 | 0.0132 | 10.1318 |
| 27.5417 | 1.4921 | 6.0534 | 0.0457 | 0.0371 | 10.5623 |
| 27.8181 | 1.5223 | 6.6545 | 0.0503 | 0.0577 | 10.8706 |
| 27.2007 | 1.4890 | 7.2552 | 0.0787 | 0.0956 | 10.1131 |
| 26.4479 | 1.4474 | 7.8615 | 0.1108 | 0.1495 | 9.3620 |
| 26.4993 | 1.4657 | 8.5134 | 0.1520 | 0.2257 | 9.5187 |
| 27.3069 | 1.4681 | 9.1878 | 0.1631 | 0.3032 | 10.2498 |
| 27.3123 | 1.5102 | 9.9167 | 0.1808 | 0.3935 | 10.3475 |
| 26.9612 | 1.4728 | 10.6336 | 0.1338 | 0.4478 | 9.9312 |
| 26.4715 | 1.5194 | 11.4203 | 0.1634 | 0.5387 | 9.5279 |
| 26.7365 | 1.5247 | 12.2253 | 0.1290 | 0.5976 | 9.6725 |
| 27.0412 | 1.5757 | 13.0963 | 0.1038 | 0.6473 | 10.0048 |
| 27.6685 | 1.5972 | 13.9984 | 0.1048 | 0.7063 | 10.7123 |
| 27.1443 | 1.6440 | 14.9621 | 0.0664 | 0.7336 | 10.1024 |
| 27.6463 | 1.6101 | 15.9100 | 0.0124 | 0.7249 | 10.5677 |
| 27.4558 | 1.6320 | 16.9155 | 0.0273 | 0.7462 | 10.4036 |
| 27.1042 | 1.6916 | 17.9983 | 0.0466 | 0.7816 | 10.1571 |
| 26.5920 | 1.6752 | 19.0752 | 0.0082 | 0.7745 | 9.6736 |
| 27.3262 | 1.6122 | 20.1232 | −0.0313 | 0.7406 | 10.3511 |
| 27.1781 | 1.6053 | 21.2124 | 0.0266 | 0.7784 | 10.2590 |
| 26.9080 | 1.5820 | 22.3070 | 0.0159 | 0.7858 | 9.8343 |
| 26.6188 | 1.5362 | 23.3875 | −0.0428 | 0.7343 | 9.5354 |
| 26.5117 | 1.5393 | 24.5139 | 0.0186 | 0.7704 | 9.4519 |
| 26.6407 | 1.5913 | 25.7236 | 0.0010 | 0.7645 | 9.5962 |
| 27.2846 | 1.6513 | 27.0098 | −0.0116 | 0.7508 | 10.1963 |
| 26.5560 | 1.5750 | 28.2117 | −0.0440 | 0.7038 | 9.6359 |
| 26.6443 | 1.6522 | 29.5626 | −0.0200 | 0.6974 | 9.5528 |
| 26.8093 | 1.6527 | 30.9114 | 0.0573 | 0.7756 | 9.7510 |
| 26.5601 | 1.5828 | 32.2008 | −0.0124 | 0.7363 | 9.4984 |
| 26.4675 | 1.5283 | 33.4766 | −0.0103 | 0.7284 | 9.4668 |
| 26.7635 | 1.4738 | 34.7308 | 0.0137 | 0.7508 | 9.8323 |
| 27.4428 | 1.5388 | 36.1198 | 0.0899 | 0.8640 | 10.4993 |
| 26.9620 | 1.5948 | 37.5820 | 0.0472 | 0.8872 | 9.9838 |
| 27.1261 | 1.6479 | 39.1192 | 0.0729 | 0.9660 | 10.0791 |
| 27.4249 | 1.5855 | 40.5724 | 0.0981 | 1.0695 | 10.3447 |
| 27.3794 | 1.5151 | 41.9813 | 0.1575 | 1.2477 | 10.2904 |
| 26.2636 | 1.5301 | 43.4713 | 0.1209 | 1.3471 | 9.2041 |

Table 4 depicts the corresponding simulated approximated GPS coordinates (Lat and Long) of the imaging UAS/first unmanned aerial vehicle in accordance with embodiments of the present invention based on the information in Tables 1-3 and previous values in Table 4:

TABLE 4

| GPS Calc Update (Computer Simulation) | |
|---|---|
| Lat | Long |
| 30.4088 | −86.3534 |
| 30.4088 | −86.3534 |
| 30.4088 | −86.3534 |
| 30.4088 | −86.3534 |
| 30.4088 | −86.3534 |
| 30.4088 | −86.3534 |
| 30.4088 | −86.3534 |
| 30.4088 | −86.3533 |
| 30.4088 | −86.3533 |
| 30.4088 | −86.3533 |
| 30.4088 | −86.3533 |
| 30.4088 | −86.3533 |
| 30.4088 | −86.3533 |
| 30.4088 | −86.3532 |
| 30.4088 | −86.3532 |
| 30.4088 | −86.3532 |
| 30.4088 | −86.3532 |
| 30.4088 | −86.3531 |
| 30.4088 | −86.3531 |
| 30.4088 | −86.3530 |
| 30.4088 | −86.3530 |
| 30.4088 | −86.3529 |
| 30.4088 | −86.3528 |
| 30.4088 | −86.3527 |
| 30.4088 | −86.3527 |
| 30.4088 | −86.3526 |
| 30.4088 | −86.3525 |
| 30.4088 | −86.3524 |
| 30.4088 | −86.3523 |
| 30.4088 | −86.3521 |
| 30.4088 | −86.3520 |
| 30.4088 | −86.3519 |
| 30.4088 | −86.3517 |
| 30.4088 | −86.3516 |
| 30.4088 | −86.3514 |
| 30.4088 | −86.3512 |
| 30.4089 | −86.3511 |
| 30.4089 | −86.3509 |
| 30.4089 | −86.3506 |
| 30.4089 | −86.3504 |
| 30.4089 | −86.3502 |
| 30.4089 | −86.3499 |
| 30.4089 | −86.3497 |
| 30.4089 | −86.3494 |
| 30.4089 | −86.3491 |
| 30.4089 | −86.3488 |
| 30.4089 | −86.3485 |
| 30.4089 | −86.3482 |
| 30.4089 | −86.3479 |
| 30.4089 | −86.3475 |
| 30.4089 | −86.3472 |
| 30.4090 | −86.3468 |
| 30.4090 | −86.3464 |
| 30.4090 | −86.3460 |
| 30.4090 | −86.3456 |
| 30.4090 | −86.3451 |
| 30.4090 | −86.3447 |

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

The invention claimed is:

1. A first unmanned aerial vehicle comprising:

a) a first optical camera mounted on the first unmanned aerial vehicle and having a first field of view;

b) a first flight controller;

c) a processor operably connected to the first optical camera and the first flight controller;

d) non-transitory computer readable memory operably connected to the processor and including processor executable code that when executed by the processor performs the steps of:
(i) obtaining, from the first optical camera, a plurality of images, each image of the plurality of images having a first predetermined image pixel length in a first coordinate direction and a first predetermined image pixel width in a second coordinate direction orthogonal to the first coordinate direction,
wherein the plurality of images includes a first image and a second image,
wherein the first image is taken at a first time while the first unmanned aerial vehicle is at a first position, and includes a first image segment representing a second unmanned aerial vehicle in a first reference position defined by a first set of pixel coordinates,
wherein at the first time, the first unmanned aerial vehicle is at a first altitude and the second unmanned aerial vehicle is at a second altitude,
wherein the second image is taken at a second time, and includes a second image segment representing the second unmanned aerial vehicle in a second reference position defined by a second set of pixel coordinates,
wherein at the second time, the first unmanned aerial vehicle is at a third altitude and the second unmanned aerial vehicle is at a fourth altitude, and
wherein the second unmanned aerial vehicle comprises predetermined vehicle dimensions including a first predetermined vehicle length and a first predetermined vehicle width;
(ii) determining a first distance travelled in a first direction by the second unmanned aerial vehicle by the steps of:
(a) obtaining, based on the first image segment, a first vehicle pixel length of the second unmanned aerial vehicle and a first vehicle pixel width of the second unmanned aerial vehicle;
(b) determining a first image length based on the first predetermined image pixel length, the first predetermined vehicle length, and the first vehicle pixel length;
(c) determining a first image width based on the first predetermined image pixel width, the first predetermined vehicle width, and the first vehicle pixel width;
(d) determining, based on the first set of pixel coordinates, the second set of pixel coordinates, the first predetermined image pixel length, the first image length, the first predetermined image pixel width, and the first image width, the first distance travelled in the first direction by the second unmanned aerial vehicle;
(iii) storing in the non-transitory computer readable memory the first vehicle pixel length, the first vehicle pixel width, the first image length, the first image width, the first distance travelled and the first direction;
(iv) generating flight instructions based on the first distance travelled, the first direction, and one or more preprogrammed flight instructions;
(v) transmitting to the first flight controller, the flight instructions
wherein the first flight controller generates a plurality of flight control signals in order to direct the first unmanned aerial vehicle to a target position at a fifth altitude based on the flight instructions; and
wherein the first unmanned aerial vehicle is directed to the target position based on commands provided based on the flight instructions; and
(vi) storing updated position information of the first unmanned aerial vehicle associated with the target position.

2. The first unmanned aerial vehicle of claim 1, wherein the first image length is a product of the first predetermined vehicle length and the first predetermined image pixel length divided by the first vehicle pixel length.

3. The first unmanned aerial vehicle of claim 1, wherein the first image width is a product of the first predetermined vehicle width and the first predetermined image pixel width divided by the first vehicle pixel width.

4. The first unmanned aerial vehicle of claim 1, wherein the first distance travelled comprises a width-wise component and a lengthwise component,
wherein the width-wise component is calculated according to the formula:

$$dx = \frac{M_{uX}}{P_{uX}}(p_{x2} - p_{x1})$$

wherein dx is the width-wise component of the first distance travelled in the first coordinate direction, $M_{uX}$ is the first predetermined vehicle width, $P_{uX}$ is the first vehicle pixel width, $p_{x2}$ is the width-wise component of the second set of pixel coordinates and $p_{x1}$ is the width-wise component of the first set of pixel coordinates, and wherein the lengthwise component is calculated according to the formula:

$$dy = \frac{M_{uY}}{P_{uY}}(p_{y2} - p_{y1})$$

wherein dy is the lengthwise component of the first distance travelled in the second coordinate direction, $M_{uY}$ is the first predetermined vehicle length, $P_{uY}$ is the first vehicle pixel length, $p_{y2}$ is the lengthwise component of the second set of pixel coordinates and $p_{y1}$ is the lengthwise component of the first set of pixel coordinates.

5. The first unmanned aerial vehicle of claim 4, wherein the target position is stored as an approximate GPS location determined according to the formulas:

$$lat_2 = lat_1 + \frac{dy}{R}\left(\frac{180}{\pi}\right) \quad (12)$$

$$long_2 = long_1 + \frac{dx}{R\cos\left(\frac{\pi lat_1}{180}\right)}\left(\frac{180}{\pi}\right) \quad (13)$$

wherein $lat^2$ is a latitude of the target position, $long_2$ is the longitude of the target position, $lat_1$ is a latitude of an initial position, and $long_1$ is the longitude of the initial position,
and wherein the second coordinate direction is north.

6. The first unmanned aerial vehicle of claim 1, wherein first distance travelled in the first direction is further based on a first height differential and a second height differential, wherein the first height differential and second height differential are determined by the steps of:

(a) obtaining, from the second image, a second vehicle pixel length of the second unmanned aerial vehicle and a second vehicle pixel width of the second unmanned aerial vehicle;

(b) determining a second image length based on the first predetermined image pixel length, the first predetermined vehicle length, and the second vehicle pixel length;

(c) determining the first height differential between the first unmanned aerial vehicle based on the first field of view and the first image length; and (d) determining the second height differential between the first unmanned aerial vehicle based on the first field of view and the second image length.

7. The first unmanned aerial vehicle of claim 1, wherein the predetermined vehicle dimensions are obtained from mission parameters stored in the non-transitory computer readable memory.

8. The first unmanned aerial vehicle of claim 1, wherein the non-transitory computer readable memory further includes processor executable code that when executed by the processor performs the steps of:

(vii) identifying, using machine vision, the second unmanned aerial vehicle; and (viii) retrieving from the non-transitory computer readable memory the predetermined vehicle dimensions, wherein the predetermined vehicle dimensions corresponding to the second unmanned aerial vehicle.

9. The first unmanned aerial vehicle of claim 1, wherein the first unmanned aerial vehicle includes a second optical camera mounted on the first unmanned aerial vehicle.

10. The first unmanned aerial vehicle of claim 9, wherein at least one of the plurality of images is based upon an output of the second optical camera.

11. The first unmanned aerial vehicle of claim 1, wherein the first unmanned aerial vehicle maintains a first flight path at the first altitude based on the one or more preprogrammed flight instructions and wherein the second unmanned aerial vehicle maintains a second flight path at the second altitude based on one or more preprogrammed flight instructions.

12. The first unmanned aerial vehicle of claim 11, wherein at the commencement of step (i), the first unmanned aerial vehicle is stationary at the first altitude and the second unmanned aerial vehicle is stationary at the second altitude.

13. The first unmanned aerial vehicle of claim 11, wherein at the commencement of step (i), the first unmanned aerial vehicle is stationary at the first altitude and the second unmanned aerial vehicle is moving along the second flight path at a first velocity at the second altitude.

14. The first unmanned aerial vehicle of claim 1, wherein a position of the first unmanned aerial vehicle is known to a first user of a first remote control system.

15. The first unmanned aerial vehicle of claim 1, wherein the flight instructions are further based on a first velocity of the first unmanned aerial vehicle.

16. The first unmanned aerial vehicle of claim 1, wherein the one or more preprogrammed flight instructions include at least a target absolute position.

17. The first unmanned aerial vehicle of claim 1, wherein the one or more preprogrammed flight instructions include at least a first flight path and a first velocity.

18. The first unmanned aerial vehicle of claim 1, wherein the one or more preprogrammed flight instructions include at least a second flight path and a second velocity.

19. The first unmanned aerial vehicle of claim 1, wherein at least one of the plurality of images is a still frame of a video.

20. The first unmanned aerial vehicle of claim 1, wherein at least one of the plurality of images is a digital photograph.

21. The first unmanned aerial vehicle of claim 1, wherein the first image includes a first centroid located at the first set of pixel coordinates.

22. The first unmanned aerial vehicle of claim 21, wherein the first centroid is within a first reference zone.

23. The first unmanned aerial vehicle of claim 1, wherein the second image includes a second centroid located at the second set of pixel coordinates.

24. The first unmanned aerial vehicle of claim 23, wherein the second centroid is within a second reference zone.

25. The first unmanned aerial vehicle of claim 1, wherein the first set of pixel coordinates includes a pixel length coordinate and a pixel width coordinate.

26. The first unmanned aerial vehicle of claim 1, wherein the second set of pixel coordinates includes a pixel length coordinate and a pixel width coordinate.

27. The first unmanned aerial vehicle of claim 1, wherein the first unmanned aerial vehicle and the second unmanned aerial vehicle form a set of unmanned aerial vehicles.

28. The first unmanned aerial vehicle of claim 1, wherein the first altitude is the same as the third altitude.

29. The first unmanned aerial vehicle of claim 1, wherein the first altitude is different than the third altitude.

30. The first unmanned aerial vehicle of claim 1, wherein the second altitude is the same as the fourth altitude.

31. The first unmanned aerial vehicle of claim 1, wherein the second altitude is different than the fourth altitude.

32. The first unmanned aerial vehicle of claim 1, wherein the flight instructions are further based on a measured wind speed.

33. A first unmanned aerial vehicle comprising:

a) a first optical camera mounted on the first unmanned aerial vehicle and having a first field of view;

b) a first flight controller;

c) a processor operably connected to the first optical camera and the first flight controller;

d) non-transitory computer readable memory operably connected to the processor and including processor executable code that when executed by the processor performs the steps of:

(i) obtaining, from the first optical camera, a plurality of images, each image of the plurality of images having a first predetermined image pixel length in a first coordinate direction and a first predetermined image pixel width in a second coordinate direction orthogonal to the first coordinate direction, wherein the plurality of images includes a first image and a second image, wherein the first image is taken at a first time while the first unmanned aerial vehicle is at a first position moving at a first velocity, and includes a first image segment representing a second unmanned aerial vehicle in a first reference position defined by a first set of pixel coordinates, wherein at the first time, the first unmanned aerial vehicle is at a first altitude and the second unmanned aerial vehicle is at a second altitude, wherein the second image is taken at a second time, and includes a second image segment representing the second unmanned aerial vehicle in a second reference position defined by a second set of pixel coordinates, wherein at the second time, the first unmanned aerial vehicle is at a third altitude and the second unmanned aerial vehicle is at a fourth altitude, and wherein the second unmanned aerial vehicle comprises predetermined vehicle dimensions including a first predetermined vehicle length and a first predetermined vehicle width;

(ii) determining a first distance travelled in a first direction by the second unmanned aerial vehicle by the steps of:

(a) obtaining, based on the first image segment, a first vehicle pixel length of the second unmanned aerial vehicle and a first vehicle pixel width of the second unmanned aerial vehicle;

(b) determining a first image length based on the first predetermined image pixel length, the first predetermined vehicle length, and the first vehicle pixel length;

(c) determining a first image width based on the first predetermined image pixel width, the first predetermined vehicle width, and first vehicle pixel width;

(d) determining, based on the first set of pixel coordinates, the second set of pixel coordinates, the first predetermined image pixel length, the first image length, the first predetermined image pixel width, the first image width, and the first velocity, the first distance travelled in the first direction by the second unmanned aerial vehicle;

(iii) storing in the non-transitory computer readable memory the first vehicle pixel length, the first vehicle pixel width, the first image length, the first image width, the first distance travelled and the first direction;

(iv) generating flight instructions based on the first distance travelled, the first direction, and one or more preprogrammed flight instructions;

(v) transmitting to the first flight controller, the flight instructions, wherein the first flight controller generates a plurality of flight control signals in order to direct the first unmanned aerial vehicle to a target position at a fifth altitude based on the flight instructions; and wherein the first unmanned aerial vehicle is directed to the target position based on commands provided based on the flight instructions; and (vi) storing updated position information of the first unmanned aerial vehicle associated with the target position.

34. The first unmanned aerial vehicle of claim 33, wherein the first distance travelled comprises a width-wise component and a lengthwise component, wherein the width-wise component is calculated according to the formula:

$$dx = \frac{M_{uX}}{P_{uX}}(p_{x2} - p_{x1}) + v_x t + \frac{1}{2}a_x t^2$$

wherein dx is the width-wise component of the first distance travelled in the first coordinate direction, $M_{uX}$ is the first predetermined vehicle width, $P_{uX}$ is the first vehicle pixel width, $p_{x2}$ is the width-wise component of the second set of pixel coordinates, $p_{x1}$ is the width-wise component of the first set of pixel coordinates, t is a difference between the second time and the first time, $v_x(t)$ is the width-wise component of the first velocity, and $a_x$ is the width-wise component of an average acceleration of the first unmanned aerial vehicle;

and wherein the lengthwise component is calculated according to the formula:

$$dy = \frac{M_{uY}}{P_{uY}}(p_{y2} - p_{y1}) + v_y t + \frac{1}{2}a_y t^2$$

wherein dy is the lengthwise component of the first distance travelled in the second coordinate direction, $M_{uY}$ is the first predetermined vehicle length, $P_{uY}$ is the first vehicle pixel length, $p_{y2}$ is the lengthwise component of the second set of pixel coordinates, $p_{y1}$ is the lengthwise component of the first set of pixel coordinates on, t is a difference between the second time and the first time, $v_y(t)$ is the lengthwise component of the first velocity, and $a_y$ is the lengthwise component of an average acceleration of the first unmanned aerial vehicle.

35. The first unmanned aerial vehicle of claim 33, wherein the first unmanned aerial vehicle maintains a first flight path at the first altitude based on the one or more preprogrammed flight instructions and wherein the second unmanned aerial vehicle maintains a second flight path at the second altitude based on one or more preprogrammed flight instructions.

36. The first unmanned aerial vehicle of claim 35, wherein at the commencement of step (i), the first unmanned aerial vehicle is moving along the first flight path at the first velocity at the first altitude and the second unmanned aerial vehicle is stationary at the second altitude.

37. The first unmanned aerial vehicle of claim 35, wherein at the commencement of step (i), the first unmanned aerial vehicle is moving along the first flight path at the first velocity at the first altitude and the second unmanned aerial vehicle is moving along the second flight path at a second velocity at the second altitude.

* * * * *